(12) United States Patent
Shepherd et al.

(10) Patent No.: US 12,161,956 B2
(45) Date of Patent: Dec. 10, 2024

(54) FILTER CARTRIDGE, FILTER ASSEMBLY, AND METHODS

(71) Applicant: Donaldson Company, Inc., Minneapolis, MN (US)

(72) Inventors: Mark C. Shepherd, Apple Valley, MN (US); Jeremy R. Reem, Inver Grove Heights, MN (US); Matthew A. Musich, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 347 days.

(21) Appl. No.: 17/473,716

(22) Filed: Sep. 13, 2021

(65) Prior Publication Data

US 2022/0088509 A1 Mar. 24, 2022

Related U.S. Application Data

(60) Provisional application No. 63/081,048, filed on Sep. 21, 2020.

(51) Int. Cl.
| | | |
|---|---|---|
| *B01D 29/21* | (2006.01) | |
| *B01D 17/04* | (2006.01) | |
| *B01D 36/00* | (2006.01) | |

(52) U.S. Cl.
CPC .......... *B01D 29/21* (2013.01); *B01D 17/045* (2013.01); *B01D 36/001* (2013.01); *B01D 2201/0453* (2013.01); *B01D 2201/16* (2013.01); *B01D 2201/304* (2013.01); *B01D 2201/316* (2013.01)

(58) Field of Classification Search
CPC .... B01D 29/21; B01D 17/045; B01D 36/001; B01D 2201/0453; B01D 2201/16; B01D 2201/304; B01D 2201/316; B01D 17/10; B01D 2201/0415; B01D 2201/291; B01D 35/147; B01D 2201/64; F02M 37/34; F02M 37/42

See application file for complete search history.

(56) References Cited

U.S. PATENT DOCUMENTS

| | | |
|---|---|---|
| 1,468,906 A | 9/1923 | Inman |
| 2,544,244 A | 3/1951 | Cecil |
| 2,612,270 A | 9/1952 | Lewis, Jr. et al. |
| 2,843,269 A | 7/1958 | Dudinec |
| 3,246,766 A | 4/1966 | Pall |

(Continued)

FOREIGN PATENT DOCUMENTS

| | | | |
|---|---|---|---|
| BR | PI0901923 A2 | * | 4/2010 |
| DE | 102016217907 A1 | * | 3/2018 |

(Continued)

*Primary Examiner* — Waqaas Ali
(74) *Attorney, Agent, or Firm* — Merchant & Gould P.C.

(57) ABSTRACT

A filter cartridge includes a tubular core movably oriented within an inner liner and having a projection having a flow passageway. The core is free-floating and movable between a first position, in which the core can move along a longitudinal axis of the core, and a sealed position, in which the core is sealed to an inner liner of the cartridge. In the sealed position, the flow passage through the projection can provide an air flow passage of air within an inner cavity to outside of the filter cartridge. Other arrangements include a filter cartridge with a free-floating core, which forms a fuel bypass between the core and a standpipe.

14 Claims, 16 Drawing Sheets

(56) References Cited

U.S. PATENT DOCUMENTS

| | | |
|---|---|---|
| 3,363,762 A | 1/1968 | Ensign |
| 3,503,511 A | 3/1970 | Spitzberg |
| 3,567,130 A | 3/1971 | Holt |
| 3,584,194 A | 6/1971 | Kautz et al. |
| 3,642,141 A | 2/1972 | Hobson, Jr. |
| 3,662,893 A | 5/1972 | Humbert, Jr. |
| 3,696,932 A | 10/1972 | Rosenberg |
| 3,800,948 A | 4/1974 | La Vallee |
| 3,836,005 A | 9/1974 | Bauer |
| 3,852,196 A | 12/1974 | Szpur |
| 4,029,121 A | 6/1977 | Buzzi |
| 4,132,641 A | 1/1979 | Elsworth |
| 4,272,368 A | 6/1981 | Foord et al. |
| 4,303,514 A | 12/1981 | Theorell |
| 4,354,931 A | 10/1982 | Allori et al. |
| 4,364,825 A | 12/1982 | Connor, Jr. |
| 4,422,938 A | 12/1983 | Miller |
| 4,442,004 A | 4/1984 | Smith et al. |
| 4,518,501 A | 5/1985 | Lennartz et al. |
| 4,555,337 A | 11/1985 | Gargas |
| 4,588,500 A | 5/1986 | Sprenger et al. |
| 4,621,508 A | 11/1986 | Baxley, Jr. et al. |
| 4,687,023 A | 8/1987 | Harbison et al. |
| 5,049,269 A | 9/1991 | Shah |
| 5,102,541 A | 4/1992 | Breitbach |
| 5,102,542 A | 4/1992 | Lawrence et al. |
| 5,104,534 A | 4/1992 | Branchcomb |
| 5,118,421 A | 6/1992 | Scarano |
| 5,132,009 A | 7/1992 | Futa, Jr. et al. |
| 5,215,655 A | 6/1993 | Mittermaier |
| 5,362,390 A | 11/1994 | Widenhoefer et al. |
| 5,399,264 A | 3/1995 | Pulek et al. |
| 5,419,373 A | 5/1995 | May |
| 5,458,767 A | 10/1995 | Stone |
| 5,643,446 A | 7/1997 | Clausen et al. |
| 5,685,985 A | 11/1997 | Brown et al. |
| 5,695,637 A | 12/1997 | Jiang et al. |
| 5,709,242 A | 1/1998 | Bergen |
| 5,714,030 A | 2/1998 | Kitamura et al. |
| 5,718,825 A | 2/1998 | Greive et al. |
| 5,730,769 A | 3/1998 | Dungs et al. |
| 5,770,054 A | 6/1998 | Ardes |
| 5,770,065 A | 6/1998 | Popoff et al. |
| 5,846,417 A | 12/1998 | Jiang et al. |
| 5,855,780 A | 1/1999 | Dye et al. |
| 5,858,227 A | 1/1999 | Stone et al. |
| 5,906,737 A | 5/1999 | Hoeppner |
| 5,922,199 A | 7/1999 | Hodgkins |
| 5,958,230 A | 9/1999 | Pyle et al. |
| 6,027,639 A | 2/2000 | Lenhart, Jr. et al. |
| 6,036,853 A | 3/2000 | Spencer |
| 6,045,598 A | 4/2000 | Fath et al. |
| 6,053,334 A | 4/2000 | Popoff et al. |
| 6,113,781 A | 9/2000 | Popoff et al. |
| 6,171,491 B1 | 1/2001 | Popoff et al. |
| 6,319,402 B1 | 11/2001 | Schwandt et al. |
| 6,328,883 B1 | 12/2001 | Jensen |
| 6,471,070 B2 | 10/2002 | Janik |
| 6,495,042 B1 | 12/2002 | Knight |
| 6,543,625 B1 | 4/2003 | Le Roux et al. |
| 6,554,139 B1 | 4/2003 | Maxwell et al. |
| 6,555,000 B2 | 4/2003 | Knight |
| 6,709,588 B2 | 3/2004 | Pavlin et al. |
| 6,837,993 B2 | 1/2005 | Clausen et al. |
| 6,884,349 B1 | 4/2005 | Jiang |
| 6,902,669 B2 | 6/2005 | Jiang |
| 6,983,851 B2 | 1/2006 | Maxwell et al. |
| 6,986,426 B2 | 1/2006 | Clausen et al. |
| 7,014,766 B2 | 3/2006 | Mack et al. |
| 7,059,481 B2 | 6/2006 | Kochert et al. |
| 7,086,537 B2 | 8/2006 | Maxwell et al. |
| 7,147,110 B2 | 12/2006 | Clausen et al. |
| 7,191,903 B2 | 3/2007 | Amesoeder |
| 7,204,370 B2 | 4/2007 | Clausen et al. |
| 7,237,569 B2 | 7/2007 | Shieh |
| 7,299,931 B2 | 11/2007 | Schachtrup et al. |
| 7,344,581 B2 | 3/2008 | Pearson et al. |
| 7,360,658 B2 | 4/2008 | Clausen et al. |
| 7,407,058 B2 | 8/2008 | Mertens et al. |
| 7,422,119 B2 | 9/2008 | Malgorn et al. |
| 7,479,219 B2 | 1/2009 | Rassinger |
| 7,543,711 B1 | 6/2009 | Stamey, Jr. et al. |
| 7,572,306 B2 | 8/2009 | Hawkins et al. |
| 7,655,140 B2 | 2/2010 | Wieczorek et al. |
| 7,717,092 B2 | 5/2010 | Wieczorek |
| 7,749,383 B2 | 7/2010 | Jiang |
| 7,854,329 B2 | 12/2010 | Malgorn et al. |
| 7,854,839 B2 | 12/2010 | Abdalla et al. |
| 7,857,974 B2 | 12/2010 | Jiang |
| RE42,059 E | 1/2011 | Jiang |
| 7,867,387 B2 | 1/2011 | Jiang et al. |
| D638,034 S | 5/2011 | Jiang et al. |
| 7,935,255 B2 | 5/2011 | Jiang |
| 7,955,500 B2 | 6/2011 | Abdalla et al. |
| 8,002,981 B2 | 8/2011 | Bagci et al. |
| 8,020,708 B2 | 9/2011 | Husband et al. |
| 8,097,061 B2 | 1/2012 | Smith et al. |
| 8,110,016 B2 | 2/2012 | Mccollam |
| 8,127,934 B2 | 3/2012 | Stamey, Jr. et al. |
| 8,128,719 B1 | 3/2012 | Heckel et al. |
| 8,128,818 B2 | 3/2012 | Jungmann et al. |
| 8,152,876 B2 | 4/2012 | Gillenberg et al. |
| 8,168,066 B2 | 5/2012 | Wieczorek et al. |
| 8,177,972 B2 | 5/2012 | Grummert et al. |
| 8,216,470 B2 | 7/2012 | Abdalla et al. |
| 8,245,851 B2 | 8/2012 | Hawkins et al. |
| 8,333,890 B2 | 12/2012 | Blizard et al. |
| 8,356,716 B1 | 1/2013 | Kruckenberg et al. |
| 8,360,251 B2 | 1/2013 | Wieczorek et al. |
| 8,388,834 B2 | 3/2013 | Rsgen et al. |
| 8,440,081 B2 | 5/2013 | Wieczorek |
| 8,496,825 B1 | 7/2013 | Jons et al. |
| 8,517,183 B2 | 8/2013 | Thomas et al. |
| 8,523,974 B2 | 9/2013 | Mei et al. |
| 8,540,805 B2 | 9/2013 | Jarrier |
| 8,551,335 B2 | 10/2013 | Wieczorek et al. |
| 8,580,109 B2 | 11/2013 | Kruckenberg et al. |
| 8,591,736 B2 | 11/2013 | Kruckenberg et al. |
| 8,678,202 B2 | 3/2014 | Wieczorek et al. |
| 8,764,984 B2 | 7/2014 | Curt et al. |
| 8,777,018 B2 | 7/2014 | Schmidt et al. |
| 8,845,896 B2 | 9/2014 | Kruckenberg et al. |
| 8,852,443 B2 | 10/2014 | Johnson et al. |
| 8,920,648 B2 | 12/2014 | Thomas et al. |
| 8,968,565 B2 | 3/2015 | Thomas et al. |
| 9,011,683 B2 | 4/2015 | South et al. |
| 9,044,695 B2 | 6/2015 | Sann et al. |
| 9,149,748 B2 | 10/2015 | Nagy et al. |
| 9,149,749 B2 | 10/2015 | Nagy et al. |
| 9,168,477 B2 | 10/2015 | Schulz et al. |
| 9,186,602 B2 | 11/2015 | Rathod et al. |
| 9,199,185 B2 | 12/2015 | Verdegan et al. |
| D751,666 S | 3/2016 | Kruckenberg et al. |
| D752,707 S | 3/2016 | Huda et al. |
| 9,486,724 B2 | 11/2016 | Volkmer et al. |
| 9,504,939 B2 | 11/2016 | Kamp et al. |
| D785,142 S | 4/2017 | Monaghan |
| 9,675,909 B2 | 6/2017 | Thomas et al. |
| 9,694,307 B2 | 7/2017 | Lans |
| D798,918 S | 10/2017 | Campbell |
| 9,782,702 B2 | 10/2017 | Carrion |
| 9,808,842 B2 | 11/2017 | Campbell |
| 9,827,528 B2 | 11/2017 | Campbell |
| 9,839,866 B2 | 12/2017 | Carrion |
| 9,845,232 B2 | 12/2017 | Campbell et al. |
| 9,884,274 B2 | 2/2018 | Sann et al. |
| 9,884,778 B2 | 2/2018 | Shao |
| 9,901,851 B2 | 2/2018 | Le Ven et al. |
| 9,937,451 B2 | 4/2018 | Kruckenberg et al. |
| 9,975,090 B2 | 5/2018 | Hoffman |
| 10,016,711 B2 | 7/2018 | Dhiman |
| 10,094,347 B2 | 10/2018 | Abdalla et al. |
| 10,138,853 B2 | 11/2018 | Abdalla |
| 10,143,949 B2 | 12/2018 | Taszarek et al. |

(56) References Cited

U.S. PATENT DOCUMENTS

| | | |
|---|---|---|
| 2005/0027552 A1 | 2/2005 | Massanelli et al. |
| 2005/0092665 A1 | 5/2005 | Kirchner |
| 2006/0191832 A1 | 8/2006 | Richie et al. |
| 2007/0084776 A1 | 4/2007 | Sasur |
| 2007/0095744 A1 | 5/2007 | Bagci et al. |
| 2007/0227964 A1 | 10/2007 | Fick et al. |
| 2010/0044303 A1 | 2/2010 | Perrault et al. |
| 2010/0294707 A1 | 11/2010 | Abdalla et al. |
| 2011/0024344 A1 | 2/2011 | Thomas et al. |
| 2011/0073538 A1 | 3/2011 | Jiang et al. |
| 2011/0084016 A1 | 4/2011 | Le Roux et al. |
| 2012/0006731 A1 | 1/2012 | Swift, Jr. |
| 2012/0160760 A1 | 6/2012 | Girondi |
| 2012/0223001 A1 | 9/2012 | Beard |
| 2013/0284661 A1 | 10/2013 | Tan et al. |
| 2014/0116931 A1 | 5/2014 | Beer et al. |
| 2014/0124459 A1 | 5/2014 | Li et al. |
| 2014/0305861 A1 * | 10/2014 | Formica ............... B01D 29/15 210/323.2 |
| 2015/0075494 A1 | 3/2015 | Bauer et al. |
| 2015/0343341 A1 | 12/2015 | Carrion |
| 2016/0228802 A1 | 8/2016 | Le Roux et al. |
| 2016/0332101 A1 | 11/2016 | Booker et al. |
| 2017/0087485 A1 | 3/2017 | Nyzen et al. |
| 2017/0106317 A1 | 4/2017 | Stamey, Jr. et al. |
| 2017/0128862 A1 | 5/2017 | Malgorn et al. |
| 2017/0197162 A1 | 7/2017 | Abdalla et al. |
| 2017/0361250 A1 | 12/2017 | Abdalla |
| 2017/0368487 A1 | 12/2017 | Bannister et al. |
| 2018/0001238 A1 | 1/2018 | Straussberger et al. |
| 2018/0126309 A1 | 5/2018 | Jiang et al. |
| 2018/0133627 A1 | 5/2018 | Le Ven et al. |
| 2018/0214803 A1 | 8/2018 | Li et al. |
| 2018/0333662 A1 | 11/2018 | Ammersdoerfer |

FOREIGN PATENT DOCUMENTS

| | | | |
|---|---|---|---|
| WO | 0139859 A1 | 6/2001 | |
| WO | 2009095339 A1 | 8/2009 | |
| WO | 2010044636 A2 | 4/2010 | |
| WO | 2013000807 A1 | 1/2013 | |
| WO | 2013024136 A1 | 2/2013 | |
| WO | 2014179852 A1 | 11/2014 | |
| WO | WO-2015042348 A1 * | 3/2015 | ............. B01D 29/21 |
| WO | 2016106170 A2 | 6/2016 | |
| WO | 2016182976 A1 | 11/2016 | |
| WO | 2017012932 A1 | 1/2017 | |
| WO | 2017155974 A1 | 9/2017 | |
| WO | 2018019933 A1 | 2/2018 | |
| WO | 2018125671 A1 | 7/2018 | |
| WO | WO-2018175289 A1 * | 9/2018 | ............. B01D 29/15 |

* cited by examiner

Return to Tank | Fuel to Engine

FILTER CARTRIDGE, FILTER ASSEMBLY, AND METHODS

This application claims priority to U.S. provisional patent application 63/081,048 filed Sep. 21, 2020.

TECHNICAL FIELD

This disclosure relates to filtration, for example, filtration for fuel filter assemblies. This disclosure also relates to the resulting assemblies and method of use.

BACKGROUND

Some filtration assemblies are designed to prevent the flow of the component being filtered, such as fuel, to an engine if a filter cartridge is not correctly installed in the system.

Improvements in filter cartridges and systems are desirable.

SUMMARY

In one aspect, a filter cartridge is provided comprising: a first filter media construction defining an interior volume, and having a first end and a second end; a first end plate connected to the first end; a second end plate connected to the second end; an inner liner extending between the first end and second end and lining the interior volume of the first filter media construction; a tubular core within the inner liner and comprising first and second opposite ends with a sidewall of a second filter media construction extending therebetween; and wherein a fuel bypass is formed between the second end of the tubular core and a standpipe, when the filter cartridge is installed on a standpipe.

In one or more embodiments:
the second filter media construction comprises hydrophobic media; or
the sidewall of the tubular core has a conical shape, wherein the second end is larger in diameter than the first end; or
the sidewall of the tubular core has a draft angle of between 0.25-3 degrees; or
the tubular core has a projection formed as a single piece with the core; the projection defining a flow passage therethrough;
the tubular core is movably oriented within the inner liner, and the tubular core is free-floating from a first position, in which the tubular core can move along a longitudinal axis of the tubular core, and a sealed position, in which the tubular core is sealed to the inner liner; or
the tubular core includes a seal member, forming a seal with the inner liner; or
the seal member is an outward radially directed seal member.

Example embodiments further include:
an inner plate, spaced from each of the first end plate and second plate, extending along a plane perpendicular to an central longitudinal axis of the liner; the inner plate having an open aperture therein; the inner liner being non-porous between the first end plate and the inner plate and defining an inner cavity structured to receive air; or
a grommet located at the second end of the first filter media construction.

In some embodiments:
the second end plate has a grommet holder extending axially away from a remaining part of the filter cartridge, and the grommet is positioned within a groove in the grommet holder; or
the grommet is inwardly radially directed; or
the first end plate has an air bleed hole; or
the inner liner includes a first section with a first inner diameter, adjacent the second end plate, and a second section with a second inner diameter smaller than the first inner diameter; the second section being axially spaced from the second end plate with the first section therebetween.

In one or more embodiments:
the tubular core includes a radially directed flange adjacent the second end of the core; the flange having an outer diameter: (i) smaller than the first inner diameter of the first section of the inner liner; and (ii) larger than the second inner diameter of the second section of the inner liner; and wherein the tubular core is axially and radially movable within the inner liner and limited in motion by the flange engaging against either the second end plate or the second section of the inner liner; or
the second end plate includes a radially directed seal member thereon; or
the radially directed seal member is outwardly directed.

Some example implementations further include a perforated outer wrap covering the first filter media and extending from the first end plate to the second end plate.

In some embodiments:
the perforated outer wrap includes: a solid unperforated section extending from the first end plate a distance of at least 25% of a length of the filter cartridge; and a perforated section extending from the unperforated section to the second end plate; or
the first end plate includes a burp valve arrangement; or
the tubular core and a remaining portion of the filter cartridge are independently separable.

In further arrangements, a combination of a filter housing and the filter cartridge as variously characterized above, is provided comprising the filter housing having a housing body with a side wall and an end wall defining a filter cartridge space, a standpipe extending from the end wall along a longitudinal axis into the filter cartridge space, the standpipe including an air flow passage, and at least one opening in the standpipe that places the air flow passage in communication with the filter cartridge space; and the filter cartridge configured for disposition within the filter cartridge space; wherein engagement of the projection with the at least one opening in the standpipe provides an air flow passage of air to outside of the filter cartridge.

In a further aspect, a filter cartridge is provided comprising: a first filter media construction defining an interior volume, and having a first end and a second end; a first end plate connected to the first end; a second end plate connected to the second end; an inner liner extending between the first end and second end and lining the interior volume of the first filter media construction; an inner plate, spaced from each of the first end plate and second plate, extending along a plane perpendicular to an central longitudinal axis of the liner; the inner plate having an open aperture therein; the inner liner being non-porous between the first end plate and the inner plate and defining an inner cavity structured to receive air; a tubular core, movably oriented within the inner liner, and having a projection; the core being movably oriented along a longitudinal axis between the second end plate and the inner plate; the projection defining a flow passage therethrough; the core being free-floating and movable from a first position, in which the core can move along the longitudinal axis of the core, and a sealed position, in which the core is sealed to the inner liner; and wherein in the sealed position, the flow passage through the projection provides an air flow passage of air within the inner cavity to outside of the filter cartridge.

In one or more embodiments:
the tubular core comprises a second filter media construction; or
the second filter media construction comprises hydrophobic media; or
the tubular core includes a seal member, forming a seal with the inner liner; or
the seal member is an outward radially directed seal member.

In example embodiments, the tubular core has first and second opposite ends; the first end of the core having the projection projecting from the first end and into an interior of the core; and the second end of the core being an open end.

In examples:
the seal member is an outward radially directed seal member circumscribing the first end of the core; or
the tubular core includes a sidewall extending between the first end of the core and the second end of the core; the sidewall having a conical shape that is larger at the second end of the core than the first end of the core; or
a fuel bypass is formed between the second end of the core and a standpipe, when the filter cartridge is installed on a standpipe; or
further including a grommet located at the second end of the first filter media construction.

In some embodiments:
the second end plate has a grommet holder extending axially away from a remaining part of the filter cartridge, and the grommet is positioned within a groove in the grommet holder; or
the grommet is inwardly radially directed; or
the first end plate has an air bleed hole; or
the projection is formed as a single piece with the core.

In another aspect, a combination of a filter housing and the filter cartridge as variously characterized above, is provided comprising: the filter housing having a housing body with a side wall and an end wall defining a filter cartridge space, a standpipe extending from the end wall along a longitudinal axis into the filter cartridge space, the standpipe including an air flow passage, and at least one opening in the standpipe that places the air flow passage in communication with the filter cartridge space; the filter cartridge configured for disposition within the filter cartridge space; wherein engagement of the projection with the at least one opening in the standpipe provides an air flow passage of air to outside of the filter cartridge.

In a further aspect, a method of installing a filter cartridge into a filter assembly is provided comprising: providing a filter housing having a housing body with a side wall and an end wall defining a filter cartridge space, a standpipe extending from the end wall along a longitudinal axis into the filter cartridge space, the standpipe including an air flow passage, and at least one opening in the standpipe that places the air flow passage in communication with the filter cartridge space; providing the filter cartridge as variously characterized above; positioning the filter cartridge over the standpipe and into the filter cartridge space to move the core from the first position to the sealed position; and aligning the flow passage through the projection with the aperture in the inner plate and engage the projection with the at least one opening in the standpipe to provide an air flow passage of air within the inner cavity of the filter cartridge to outside of the filter cartridge.

The method may further include forming a seal between a grommet on the filter cartridge and the standpipe.

In another aspect, a method of filtering fuel includes providing a filter cartridge as characterized above, installed over a standpipe in a filter housing; and allowing some fuel to bypass the tubular core between the second end of the core and the standpipe.

In another aspect, a method of installing a filter cartridge into a filter assembly is provided comprising: providing a filter housing having a housing body with a side wall and an end wall defining a filter cartridge space, a standpipe extending from the end wall into the filter cartridge space; providing the filter cartridge as variously characterized above; the filter cartridge have a central longitudinal axis; and positioning the filter cartridge over the standpipe and into the filter cartridge space to move the tubular core into an off axis position on the standpipe which is not co-linear with the central longitudinal axis of the filter cartridge.

In example methods:
the tubular core includes a radially directed flange adjacent the second end of the core; and the step of positioning the filter cartridge includes moving the tubular core until the radially directed flange engages against the inner liner; or
the step of positioning the filter cartridge over the standpipe includes: first, positioning the tubular core over the standpipe; and second, positioning the filter cartridge, separate of the tubular core, over the tubular core and onto the standpipe.

In another aspect a kit is provided comprising: a filter cartridge including a first filter media construction defining an interior volume, and having a first end and a second end; a first end plate connected to the first end; a second end plate connected to the second end; and an inner liner extending between the first end and second end and lining the interior volume of the first filter media construction; and a tubular core sized to fit within the inner liner and comprising first and second opposite ends with a sidewall of a second filter media construction extending therebetween.

It is noted that not all the specific features described herein need to be incorporated in an arrangement for the arrangement to have some selected advantage according to the present disclosure.

DETAILED DESCRIPTION

A. Existing Filter Systems, FIGS. 1-5

Figure 1:
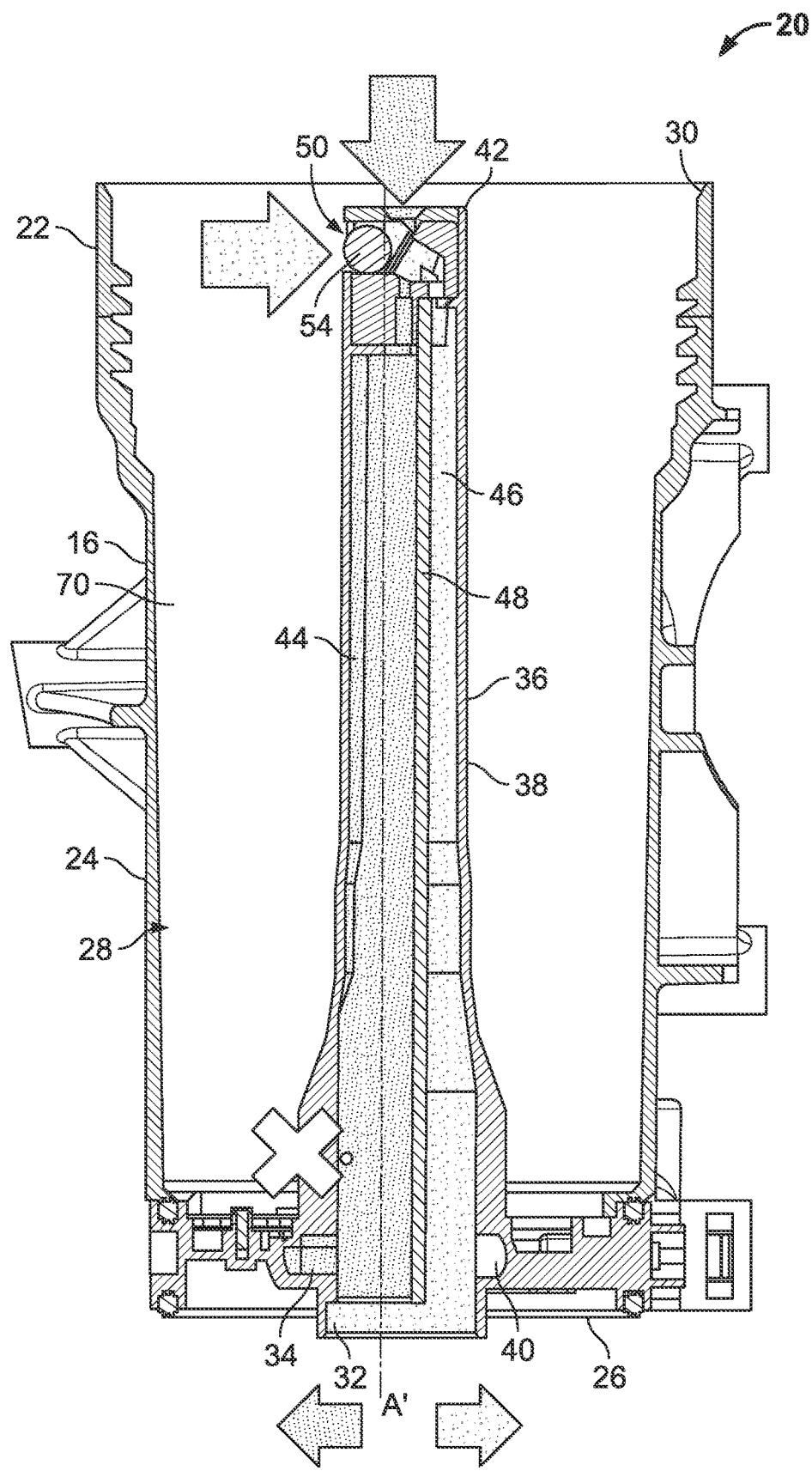
FIG. 1 is a schematic, cross-sectional view showing a prior art filter housing and standpipe, and showing the fluid flow path therethrough.

FIGS. 1-5 show an existing filter system at 20. The system 20 is a schematic illustration of parts of the system 20 including a filter housing 22 that is designed to receive a filter cartridge (not depicted in FIG. 1) for filtering fluid, such as fuel. The filter housing 22 has a side wall 24 and an end wall 26. The side wall 24 and end wall 26 define a filter cartridge space 28 that is large enough to receive a filter cartridge therein, with the end wall 26 forming a closed end of the space 28. The housing 22 has an open end or mouth 30 opposite of the end wall 26. The housing 22 includes an inlet opening (not shown) through which a liquid, such as fuel, to be filtered enters the space 28. A clean liquid outlet is shown at 32 near the end wall 26, through which the filtered liquid exits on its way to the engine. An air outlet 34 is also near the end wall 26 through which air, in the filter housing 22, returns to the fuel tank.

A fluid passageway in the form of a standpipe 36 is secured to the end wall 26 and extends upwardly into the space 28 toward the open mouth 20 of the housing 22. The standpipe 36 includes a generally cylindrical body having a side wall 38 extending from its bottom end 40 adjacent the end wall 26 to a terminal end 42. The side wall 38 encloses a space that is divided into an air flow passage 44 and a clean liquid (fuel) flow passage 46 by a divider 48. The air flow passage 34 is in communication with the air outlet 34 so that the air that enters the standpipe 36 can flow from the standpipe 36 and into the air outlet 34 to exit the fuel assembly and be directed back to the fuel tank. The clean fuel flow passage 46 is in communication with the clean fuel outlet 32 so that the clean fuel that enters the standpipe 36 can flow from the standpipe 36 and into the clean fuel outlet 32 to the engine.

A flow restriction valve assembly 50 is disposed at the terminal end 42 of the standpipe 36 to control the flow of fuel into the standpipe 36 and to provide an air passage leading to the outside of the filter system 20. The valve assembly 50 can prevent fuel flow into the standpipe 36 when the filter cartridge (not shown) is not installed, or when an incorrect filter cartridge is installed.

Figure 2:
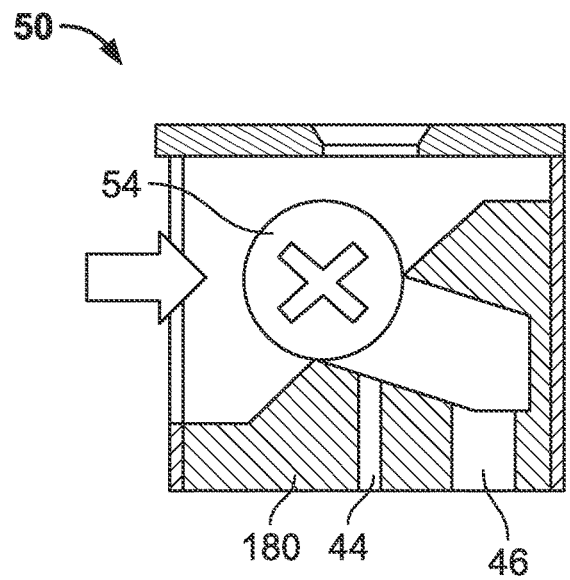
FIG. 2 is a schematic cross-sectional view of a prior art valve assembly used in the standpipe of FIG. 1.

In reference now to FIGS. 2-5, the terminal end 42 of the standpipe 36 is open, and then valve assembly 50 is secured in the terminal end 42. The valve assembly 50 includes a valve ball 54. In FIG. 2, before the filter cartridge is installed, the ball 54 serves to block fuel flow through the clean fuel passage 46. This prevents all fuel flow in the housing 22 when a filter cartridge is not installed or when an improperly fitting filter cartridge is installed.

Figure 3:
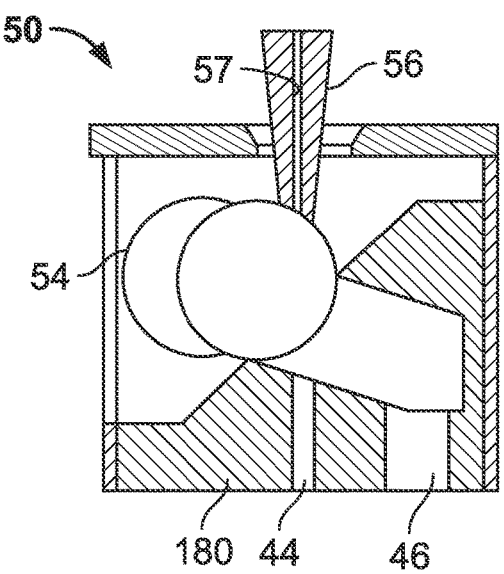
FIG. 3 is another schematic cross-sectional view of valve assembly used in the standpipe of FIG. 1.

In FIG. 3 as a filter cartridge is installed, a projection 56 dislodges the ball 54, opening the air flow passage 44 and clean fuel passage 46. The projection 56 has an open passageway 57 extending therethrough.

Figure 4:
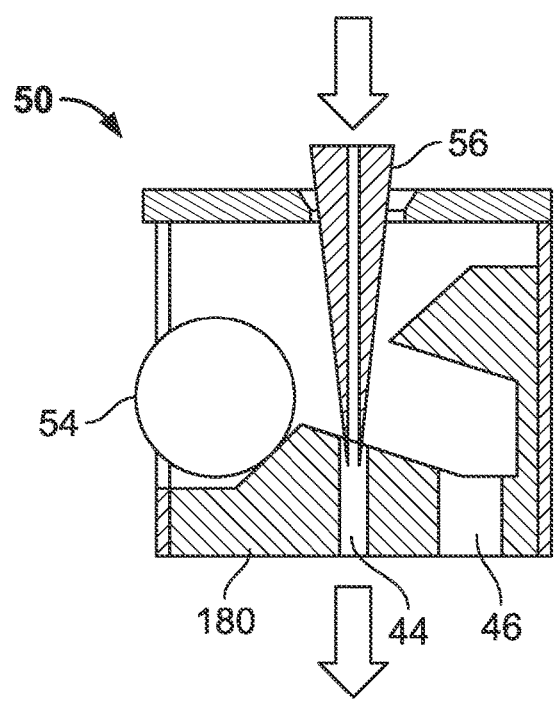
FIG. 4 is another schematic cross-sectional view of the valve assembly used in the standpipe of FIG. 1.

In FIG. 4, the projection 56 engages a rubber member 180 and is in communication with the air flow passage 44. This allows air and unfiltered fuel to flow therethrough and exit the housing 22 through the air outlet 34. The open passageway 57 in the projection 56 allows the air flow and unfiltered fuel to flow through.

Figure 5:
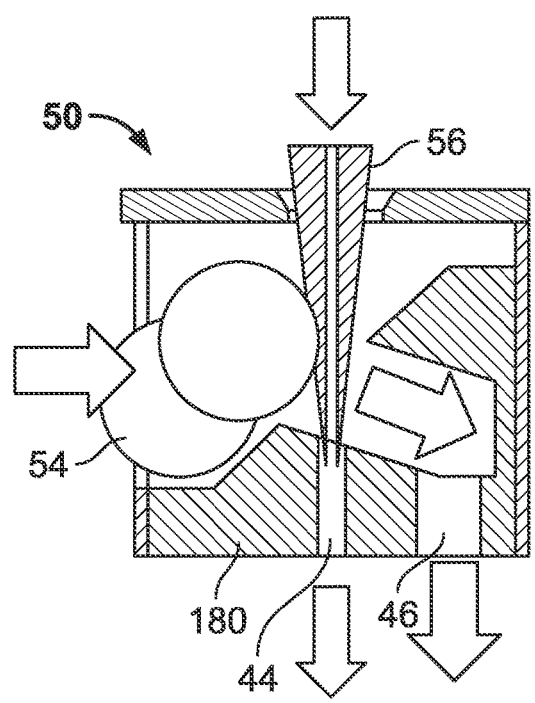
FIG. 5 is another schematic cross-sectional view of the valve assembly used in the standpipe of FIG. 1.

In FIG. 5, unfiltered fuel continues to flow (bleed) through the passageway 57 in the projection 56 and exit the housing 22. Filtered fuel enters the standpipe 36, flows around the ball 54 and around the projection 56, and enters the clean fuel passageway 46 where it flows through the clean outlet 32 and to the engine.

B. Example Filter System, FIG. 6

Figure 6:
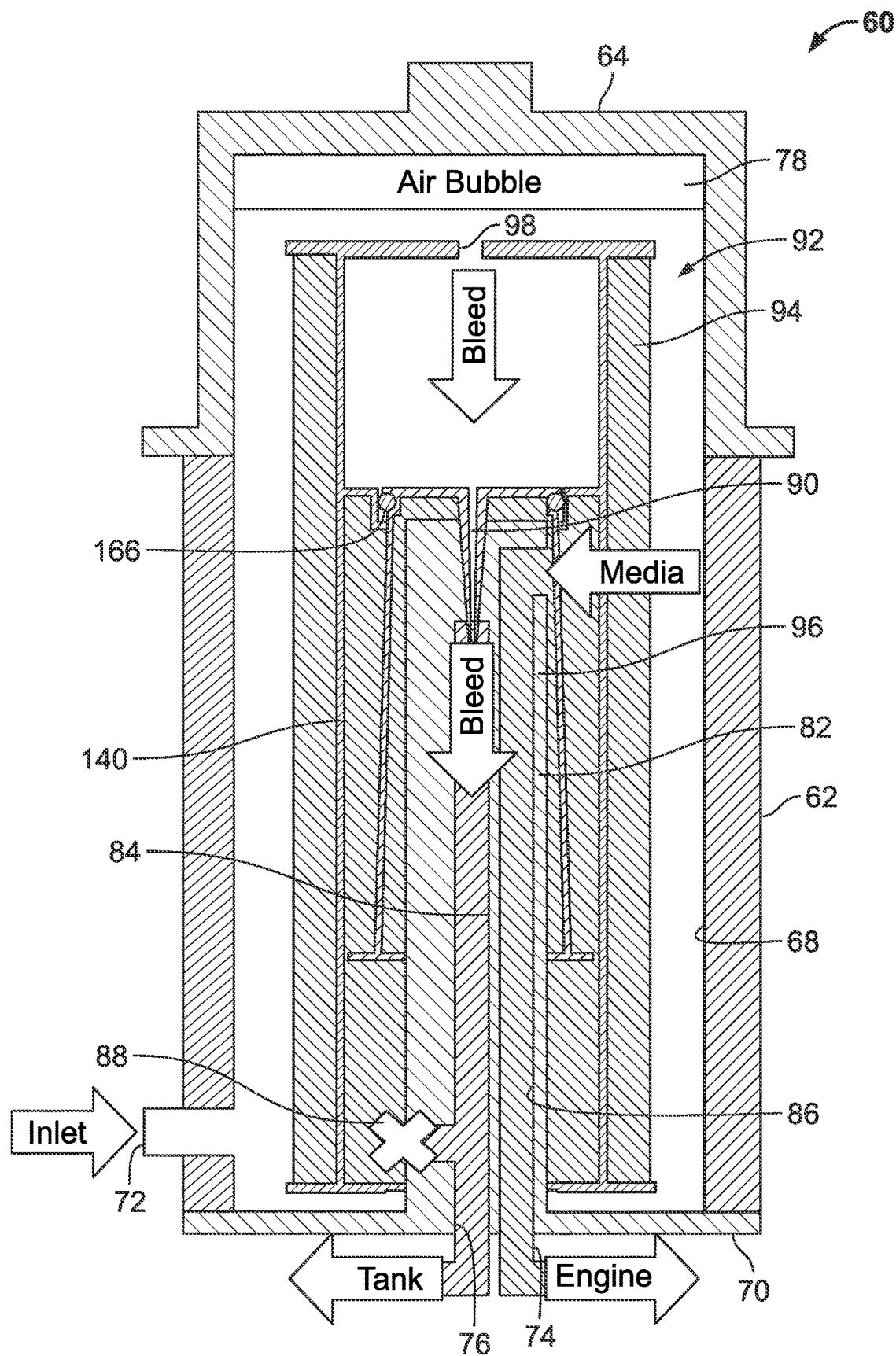
FIG. 6 is a schematic illustration of a filter system, constructed in accordance with principles of this disclosure.

In reference now to FIG. 6, a system 60 is shown schematically, constructed in accordance with principles of this disclosure. The system 60 includes a housing 62 having a removable cover 64. The housing 62 includes a side wall 66 that surrounds and defines an interior volume 68. An end wall 70 closes the bottom of the housing 62 and is opposite the removable cover 64.

An unfiltered liquid flow inlet passes through the side wall 66 of the housing 62 and allows for the flow of unfiltered liquid, such as unfiltered fuel into the interior volume 68 of the housing 62. A filtered liquid outlet 74 is near the end wall 70 and allows filtered liquid to exit the system 60 where it flows to downstream equipment, such as the engine. An air outlet 76 is also near the end wall 70 through which air 78, in the filter housing 62, returns to the fuel tank.

A standpipe 80 is secured to the end wall 70 and extends upwardly into the volume 68 toward the cover 64 of the housing 62. The standpipe 80 is generally the same construction as standpipe 36, described previously with respect to FIG. 1. As such, the standpipe 80 includes a generally cylindrical body having a sidewall 82 that is divided into an air flow passage 84 and a clean fuel flow passage 86. The air flow passage 84 is in communication with the air outlet 76 so that the air 78 that enters the standpipe 80 can flow from the standpipe 80 and into the air outlet 76 to exit the system 60 and be directed back to the fuel tank. A clean fuel passage 86 is in communication with the clean fuel outlet 74 so that the clean fuel that enters the standpipe 82 can flow from the standpipe 82 and into the clean fuel outlet 74 and flow to the engine.

At the base of the standpipe 80, but located inside of the volume 68 of the housing 62, is an unfiltered fuel outlet 88. In FIG. 6, the unfiltered fuel outlet 88 is covered schematically with an X to indicate that, in the view shown in FIG. 6, it is sealed closed. In use, the unfiltered fuel outlet 88 allows unfiltered fuel that is within the volume 68 of the housing 62 to flow through the standpipe 80 and exit the housing 62 through the air outlet 76 and be returned to the fuel tank. The unfiltered fuel outlet 88 is unsealed or opened when a filter cartridge is removed from the housing 62 during servicing. Example usable filter cartridges are described further below.

The standpipe 80 can include a valve assembly, such as the valve assembly 50 described previously in connection with FIGS. 1-5. When a filter cartridge is installed within the housing 62, an air flow bleed passageway 90 is opened up to allow air 78 that is trapped between the cover 64 and the remaining contents in the volume 68 of the housing 62 to exit by flowing through the bleed passageway, through the air outlet 76, and back to the fuel tank.

Located within the volume 68 and positioned over the standpipe 80 is a filter cartridge 92. The filter cartridge 92, in general, includes filter media 94, which operates to remove particulate and debris from the fuel flowing into the system 60 through the unfiltered inlet 72. After flowing through the media 74, the filtered fuel then flows through a filtered port 96 in the standpipe 80, where it enters the clean fuel passageway 86 and exits through the filtered liquid outlet 74 to be used by the engine.

The filter cartridge 92 includes a small bleed hole 98 in an upper portion thereof, which allows for air 78 to flow into the bleed passageway 90 and into the air flow passageway 84 to exit the system 60 through the air outlet 76. The bleed hole 98 also allows for a small amount of unfiltered fuel to pass through and flow back to the fuel tank through the bleed passageway 90 and air flow passageway 84, and then through the air outlet 76.

When the filter cartridge 92 is positioned over the standpipe 80, it seals closed the unfiltered fuel outlet 88 in the standpipe 80. When the filter cartridge 92 is removed from the housing 62, after the cover 64 has been removed, the unfiltered fuel outlet is opened, and allows any fuel within the volume 68 of the housing 62 to drain through the unfiltered fuel outlet 88 and flow through the air outlet 76 back to the fuel tank.

C. Example Cartridges, FIGS. 7-14

Figure 7:
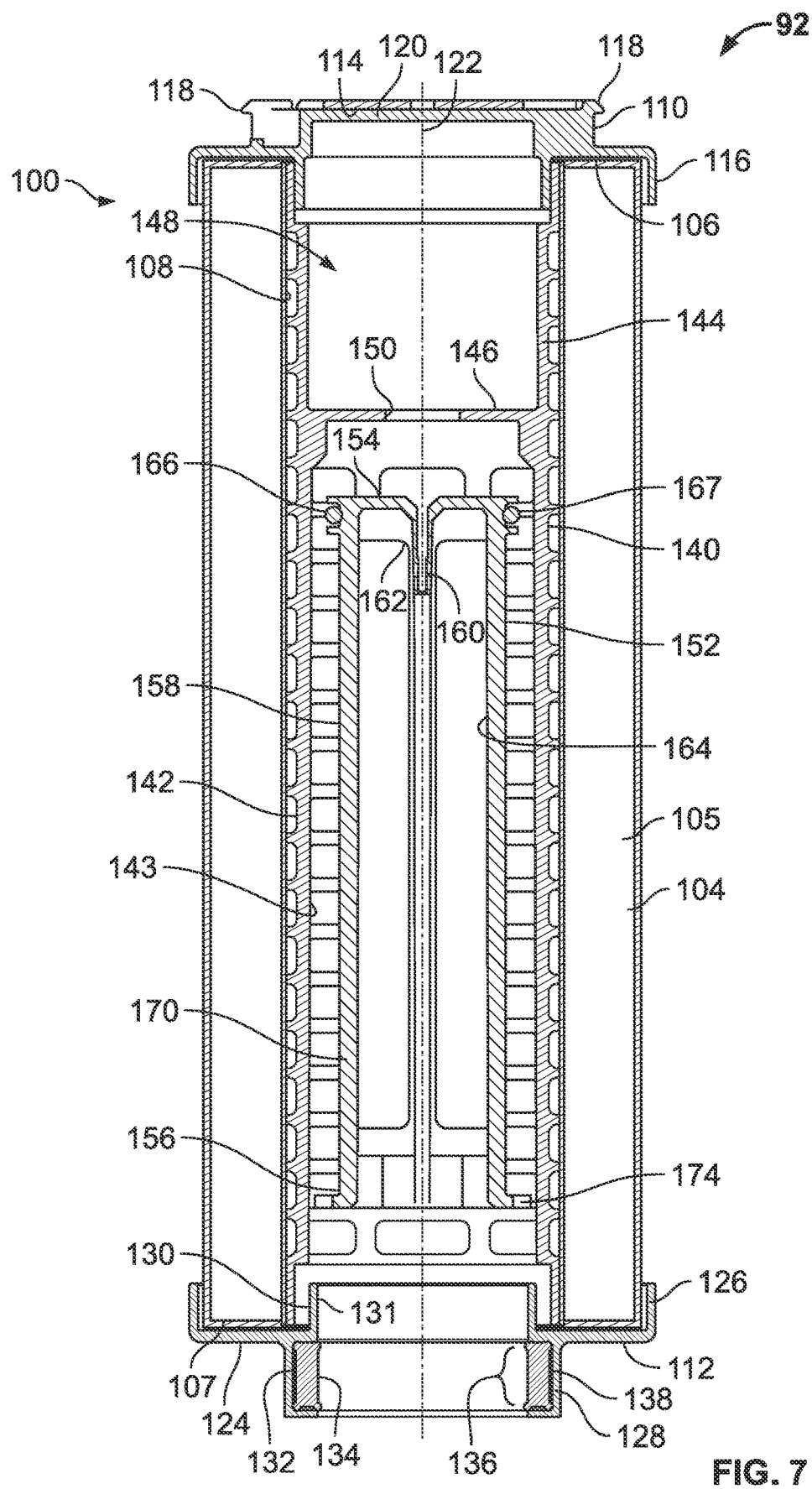
FIG. 7 is a cross-sectional view of an embodiment of a filter cartridge usable in the system of FIG. 6, constructed in accordance with principles of this disclosure.
Figure 8:
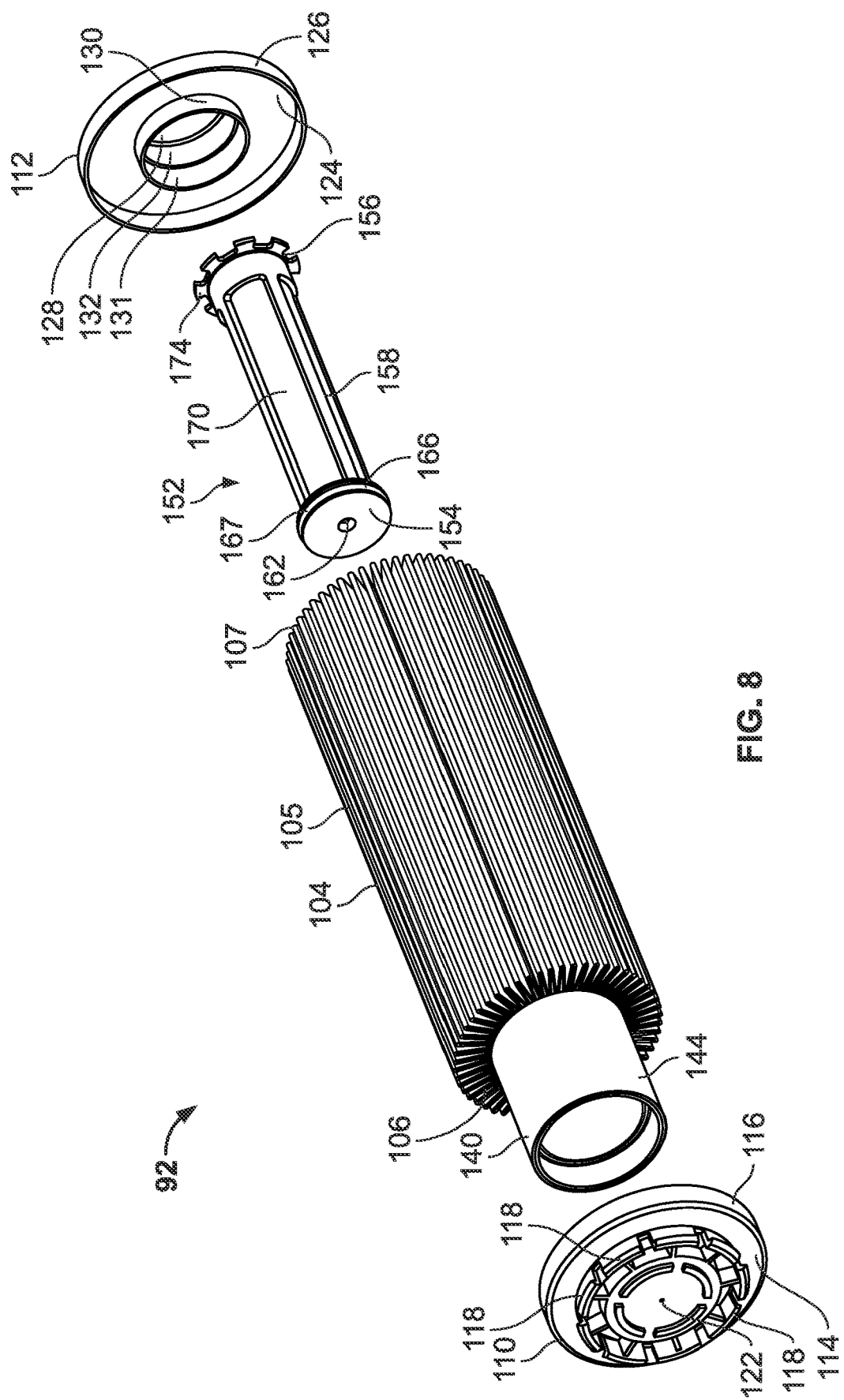
FIG. 8 is an exploded perspective view of the filter cartridge of FIG. 7.
Figure 9:
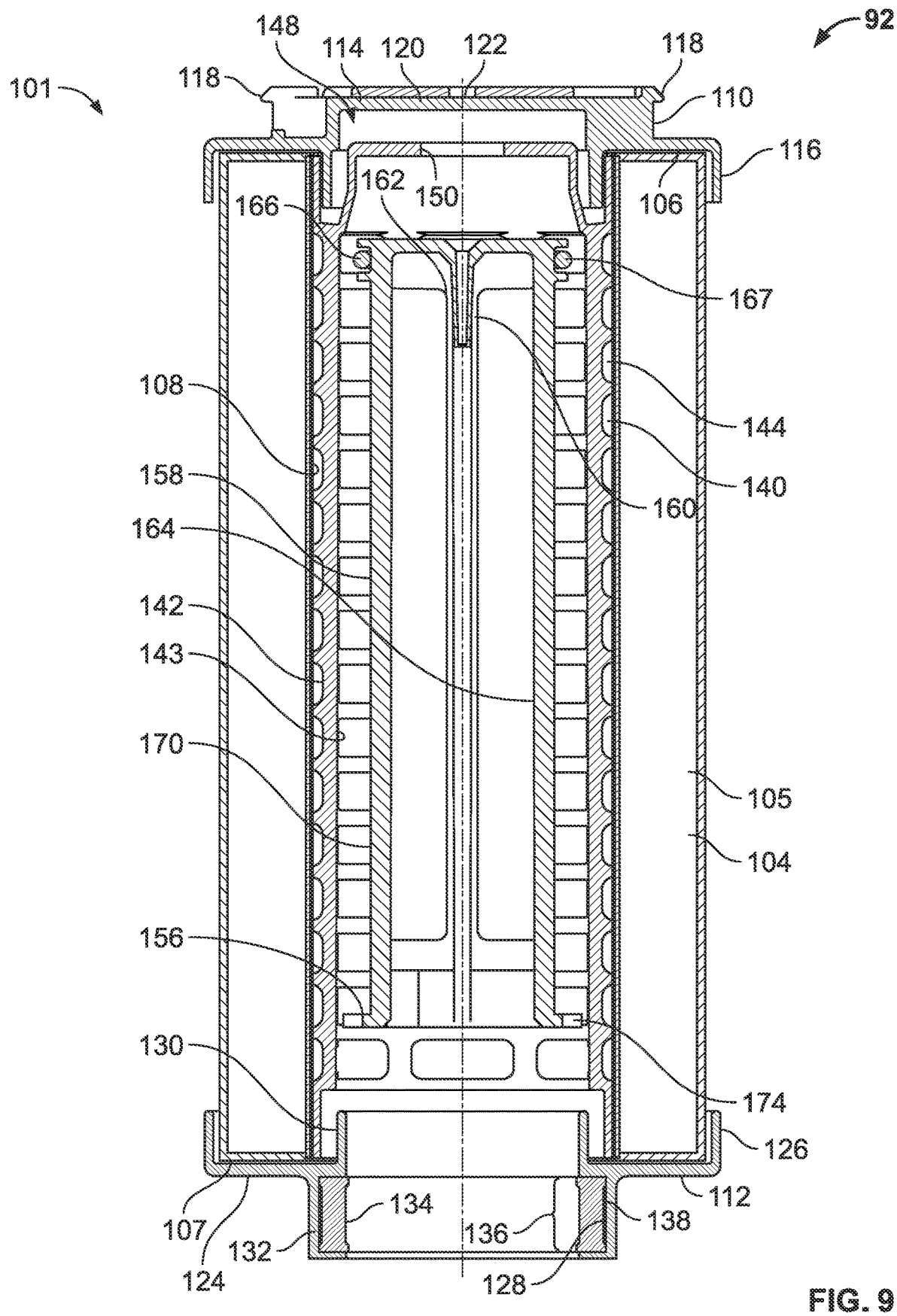
FIG. 9 is a cross-sectional view of another embodiment of a filter cartridge usable with the filter system of FIG. 6, constructed in accordance with principles of this disclosure.
Figure 10:
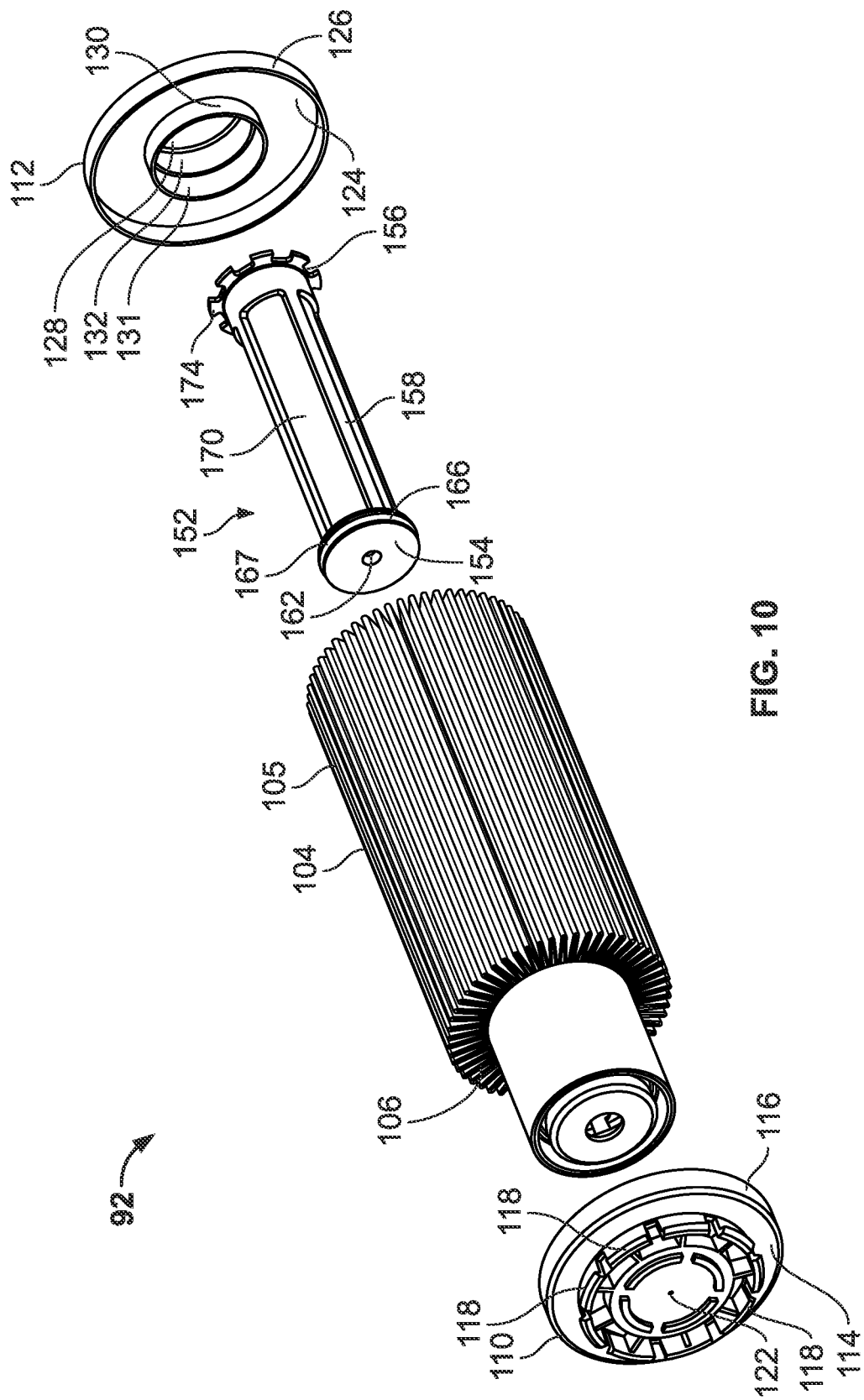
FIG. 10 is an exploded, perspective view of the filter cartridge of FIG. 9.

Attention is now directed to FIGS. 7-10, which depict two embodiments of filter cartridges 92 usable within the system 60 of FIG. 6. The filter cartridges 92 shown in FIGS. 7-10 include a filter cartridge 100 (FIGS. 7 and 8) and a filter cartridge 101 (FIGS. 9 and 10). Filter cartridges 100, 101 are identical in structure, with the exception of the length. That is, depending on the size of the system 60, the appropriate filter cartridge 100, 101 will be selected to fit within the system 60. The description for the cartridges 100, 101 are the same, and will include the same reference numbers, generically, referring to both filter cartridges 100, 101, the cartridges will be referred to by reference numeral 92.

The filter cartridge 92 includes a first filter media construction 104. The first filter media construction 104 can be many different types of filter media, but generally is preferably pleated media 105. The pleated media 105 forms a tubular extension having a first end 106 and an opposite second end 107. The tubular construction can be generally cylindrical, defining an open interior volume 108.

The filter cartridge 92 further includes a first end plate 110 connected to the first end 106, and a second end plate 112 connected to the second end 107.

The first end plate 110 can be seen in perspective view in FIGS. 8 and 10. The first end plate 110 has a generally round outer shape with an axial surface 114 surrounded by an annular perimeter rim 116. Extending from the axial surface 114 are a plurality of hooked projections 118. The hooked projections 118 can be constructed to interact with the cover 64, in some embodiments.

In the center of the axial surface 114 of the first end plate 110 is a generally closed surface 120, which defines a small air bleed hole 122. The bleed hole 122 has a diameter of no greater than 1 cm, and is generally less than 10% of the overall diameter of the first end plate 110. The bleed hole 122 allows air 78 that is contained between the cover 64 and the housing 62 to be evacuated from the system 60 by way of flow through the bleed passageway 90, the air flow passageway 84, and then through the air outlet 76.

The second end plate 112 can be seen in perspective view in FIGS. 8 and 10. The second end plate 112 is generally round with an axial section 124 surrounded by an annular perimeter rim 126.

The axial section 124 of the second end plate 112 surrounds an open aperture 128. An inner axially extending rim 130 surrounds the open aperture 128. In the cross-sectional views of FIGS. 7 and 9, it can be seen how the inner rim 130 includes a first section 131 projecting into the interior volume 108 and a second section 132 projecting axially away from a remaining portion of the filter cartridge 92.

The filter cartridge 92 includes a grommet 134. The grommet 134 is located at the second end 107 of the first filter media construction 104. In general, the grommet 134 is for sealing closed the unfiltered outlet 88 on the standpipe 80, when the filter cartridge 92 is removed from the standpipe 80, the grommet 134 is removed from covering the unfiltered fuel outlet 88, and any unfiltered fuel within the housing 62 can flow therethrough, into the air flow passageway 84, and exit through the air outlet 76.

The grommet 134 can be attached to the filter cartridge 92 in many different configurations. In the example shown, the grommet 134 is held by a grommet holder 136, which is defined by the second section 132 of the inner rim 130 of the second end plate 112. The grommet holder 136 extends axially away from a remaining part of the filter cartridge 92. The grommet 134 is positioned within a groove 138 in the grommet holder 136. In the example shown, the grommet 134 is inwardly radially directed between and against the second section 132 of the second end plate 112 and the outer side wall 82 of the standpipe 80.

The filter cartridge 92 further includes an inner liner 140. The inner liner 140 extends between the first end 106 and second end 107 and lines the interior volume 108 of the first filter media construction 104. The inner liner 140 includes a porous section 142, in which liquid is allowed to flow through the inner liner 140 to an interior 143, and a non-porous section 144. The non-porous section 144 does not permit the flow of liquid through it.

The filter cartridge 92 further includes an inner plate 146. The inner plate 146 is spaced from each of the first end plate 110 and second end plate 112. The inner plate 146 extends along a plane perpendicular to a central longitudinal axis of the inner liner 140, the longitudinal axis passing through the first end plate 110 and second end plate 112. In this embodiment, the inner plate 146 is generally parallel to the first end plate 110 and second end plate 112.

The inner plate 146, in this embodiment, is spaced closer to the first end plate 110, than the second plate 112. An inner cavity 148 is defined between the first end plate 110 and inner plate 146, with the non-porous section 144 of the inner liner 140 forming the surrounding wall to the cavity 148. The non-porous section 144 extends between the first end plate 110 and the inner plate 146.

The inner plate 146 defines an open aperture 150 extending therethough. The open aperture 150 is in fluid communication with the inner cavity 148. The inner cavity 148 is positioned to receive air therewithin.

In accordance with principles of this disclosure, the filter cartridge 92 includes a tubular core 152. The tubular core 152 is movably oriented within the inner liner 140.

The tubular core 152 is movably oriented along a longitudinal axis along a longitudinal axis between the second end plate 112 and the inner plate 146. As such, the core 152 is a free-floating core, which moves along a longitudinal axis of the core 152.

The tubular core 152 has a first end 154 and an opposite second end 156. A side wall 158 extends between the first end 154 and second end 156.

In many example embodiments, the tubular core 152 includes a pin or projection 160. The projection 160 may be formed as a single piece with the rest of the core 152. In other embodiments, it could be a separate piece. The projection 160 defines an open flow passage 162 therethrough. While many embodiments are possible, in the example shown, the projection 160 projects from the first end 154 and into an interior volume 164 of the core 152. The first end 154 of the core 152 is generally solid and non-porous, with the exception of the flow passage 162 defined by the projection 160. The second end 156 of the core 152 is an open end.

As will be explained in further detail below, the core 152 is free-floating and movable between a first position, in which the core 152 can move along the longitudinal axis of the core 152 and a sealed position in which the core is removably sealed to the inner liner 140. When the core 152 is in the sealed position, a flow passage 162 through the projection 160 provides an air flow passage of air from within the inner cavity 148 to outside of the filter cartridge 92 by way of the aperture 150 in the inner plate 146.

The tubular core 152 includes a seal member 166. The seal member 166 is used to form the releasable seal with the inner liner 140, when the core 152 is in the sealed position.

In the example embodiment shown, the seal member 166 is an outwardly radially directed seal member 167. The outward radially seal member 167 can be located adjacent to the first end 154 of the core 152 and against the side wall 158 of the core 152. As can be seen in FIGS. 7 and 9, the outwardly radially inwardly seal member 167 circumscribes the first end 154 of the core 152.

In many embodiments, the tubular core 152 comprises a second filter media construction 170. The second filter media construction 170 can be various types of filter media, but when used in system 60 for a fuel filter, it is convenient for the second filter media construction 170 to comprise hydrophobic media. The hydrophobic media will repel and prevent water from penetrating. As such, it will encourage the formation of water droplets to coalesce and drip by gravity to the bottom of the filter cartridge 92.

In many embodiments, the side wall 158 of the core 152 has a conical shape that is larger at the second end 156 than the first end 154, but in other arrangements, the core 152 can be a straight cylinder, without the conical shape. A fuel bypass 172 (FIG. 13) is formed between the second end 156 of the core 152 and the standpipe 80, during filtering operation, when the cartridge 92 is installed on the standpipe 80. The side wall 158 can have a draft angle from the first end 154 to the second end 156 of between 0.25-3 degrees to define the conical shape of the side wall 158.

The conical shape to the tubular core 152 includes advantages. For example, the shape can help align the standpipe 80 into the core 152 as the cartridge 92 is being installed into the housing 62. The core 152 is narrower at the first end 154 to help ensure that the projection 160 can self-center into the standpipe 80 and engage properly. Self-centering onto the standpipe 80 will help to align the seal member 166 of the core 152 properly as it engages the corresponding sealing surface along the inside wall of the inner liner 140.

At the second end 156 of the core 152 is a radially extending outer flange 174. The outer flange 174 has both inner radial clearance to the standpipe 80 and outer radial clearance to the inner liner 140. These two clearances result in that the second end 156 of the core 152 has no significant contact constraining its degrees of freedom when fully installed. Instead, the installed contact points are located at the first end 154 of the core 152 by way of the seal member 166 and the engagement of the projection 160 with the standpipe 80. This allows the core 152 to have more remaining freedom to self-align within the assembly and accommodate misalignment or assembly tolerance needed by the housing 62 and the standpipe 80.

The flow passage 162 in the projection 160 allows the system 60 to evacuate air from the housing 62 with a simple cover 64. Trapped air would prevent usage of the filter cartridge 92, which would result in a premature end of life for the cartridge 92.

During filtration, air 78 is directed back to the fuel tank so it can be removed from the system 60. Once primed, unfiltered fuel from the outside of the first filter media construction 104 follows this same path as the air 78, by flowing through the bleed hole 122, into the inner cavity 148, through the flow passage 162 in the projection 160, into the air flow passage 84, and then out through the air outlet 76. This unfiltered fuel acts as a constant bleed back to the fuel tank through the flow path in the projection 160. The radial seal formed by the outwardly directed seal member 167 on the core 152 avoids a constant bleed of unfiltered fuel from flowing through the clean fuel filter passageway 86 and to the engine.

The free end or tip of the projection 160 is made from a hard material, such as hard plastic. This projection 160 seals radially when inserted into rubber member 180 (FIGS. 2-5) on the inside of the standpipe 80. The sealing engagement with the standpipe 80 and the projection 160, and the correct size for the flow passage 162 through the projection 160 contribute to controlling the return to the fuel tank and avoiding staving the engine of fuel.

As mentioned above, a bypass 172 (FIG. 13) is formed. This has found to have advantages. For example, one problem often encountered is that the use of hydrophobic media/screens as a final separation mechanism for removing water droplets from fuel can depend on several factors, one of which is the face velocity of the fuel stream on the screen. Screen effectiveness might also depend on the pressure differential across the screen. Lowering the differential pressure can increase the water separation effectiveness of the screen. By using the bypass 172, the face velocity to the second filter media construction 170 is lowered, and the differential pressure across the second filter media construction 170 is lowered. The advantages observed from reduction and face velocity and the pressure differential outweigh any effect of having a limiting amount of fuel bypass the second filter media construction 170. The bypass 172 contributes to controlling coalesced water droplets sized distributions that are discharged from the filter cartridge 92.

Figure 11:
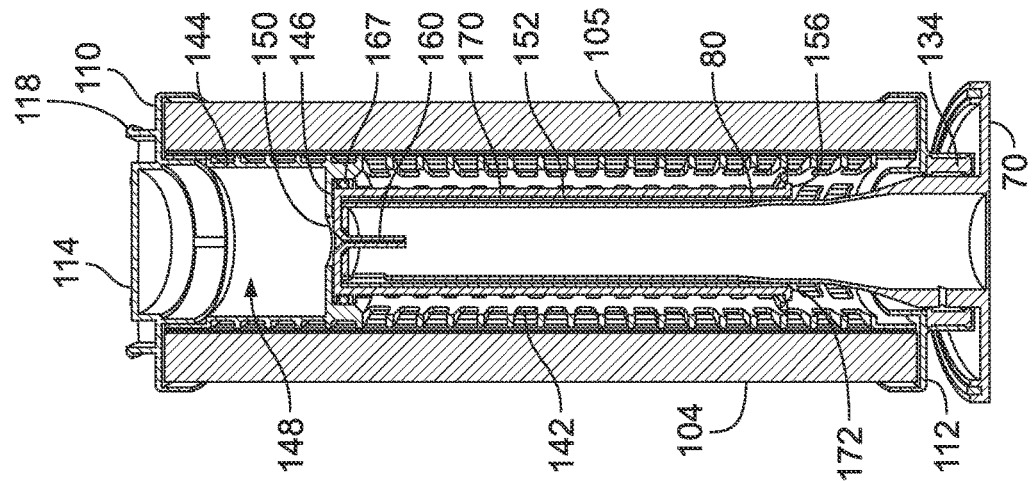
FIG. 11 is a schematic, cross-sectional view of the filter cartridge of FIG. 9.
Figure 12:
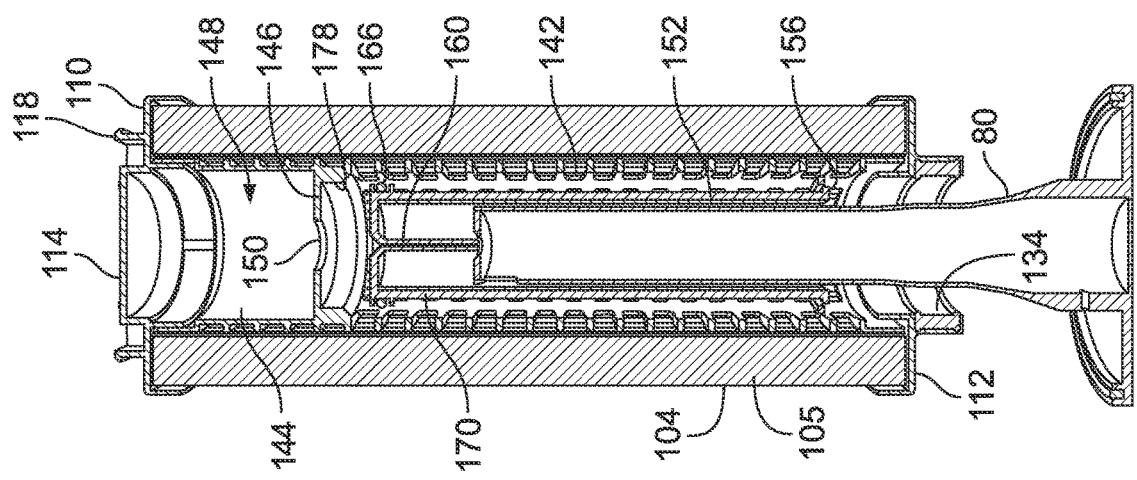
FIG. 12 is a schematic, cross-sectional view showing one step of positioning the filter cartridge of FIG. 11 onto a standpipe, such as a standpipe shown in FIG. 1.
Figure 13:
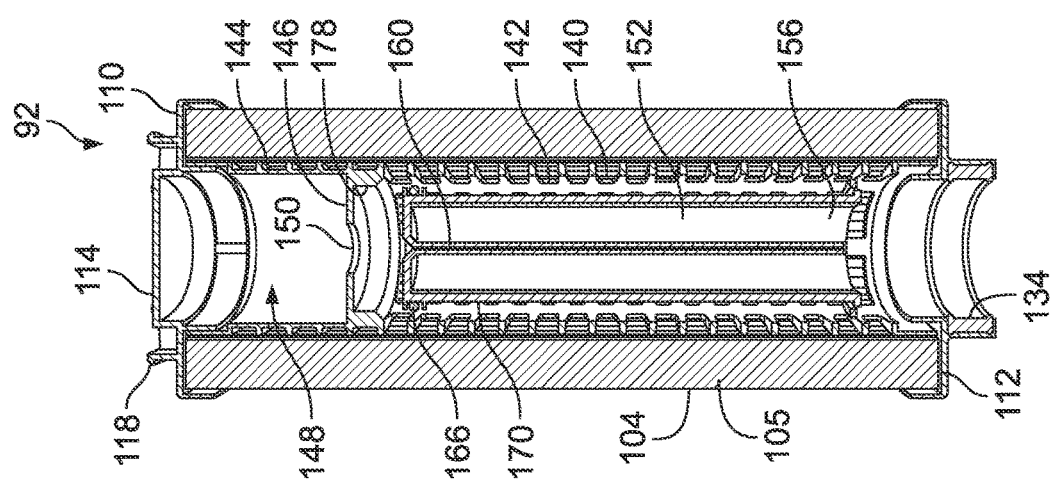
FIG. 13 is a schematic, cross-sectional view showing a final step of positioning the filter cartridge of FIG. 11 onto a standpipe, such as the standpipe shown in FIG. 1.
Figure 14:
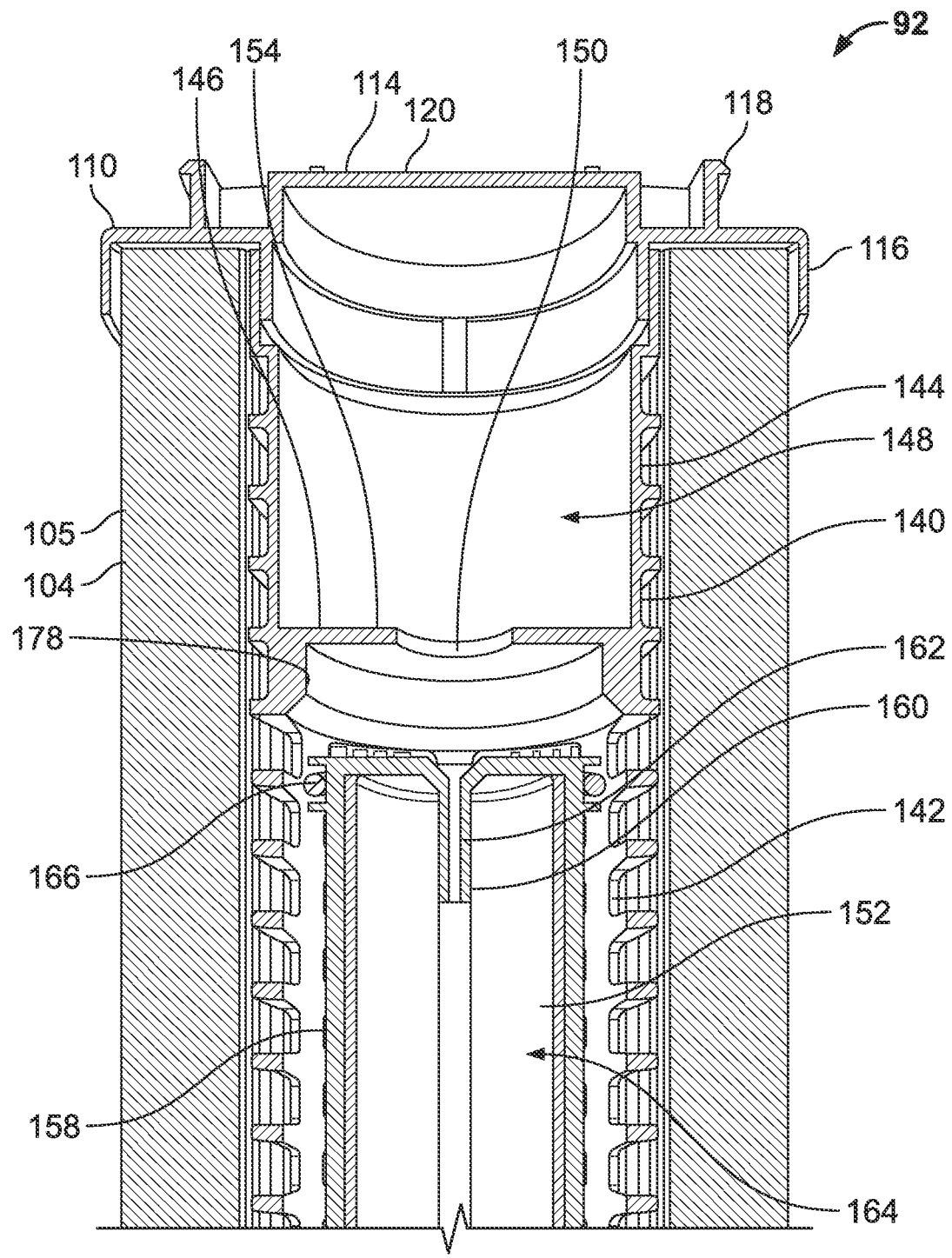
FIG. 14 is a close up view of a portion of the filter cartridge of FIG. 11.

Attention is directed to FIGS. 11-14. FIGS. 11 and 14 show the filter cartridge 92, in which the tubular core 152 is in the first position, and ready to be installed or positioned over the standpipe 80. As can be seen in FIGS. 11 and 14, the seal member 166 is away from the sealing surface 178 along the inner wall of the inner liner 140, which is just adjacent to the inner plate 146.

FIG. 12 shows a first step in positioning the filter cartridge 92 over the standpipe 80. The filter cartridge 92 is being positioned over the standpipe 80 and within the interior volume 68, which is the filter cartridge space, within the housing 62. FIGS. 12 and 13 omit the housing 62 for purposes of clarity.

As the filter cartridge 92 is lowered over the standpipe 80, eventually the projection 160 will engage the rubber member 180 (FIGS. 2-5) in the interior of the standpipe 80. This will then cause the tubular core 152 to move axially within the inner liner 140 from a direction from the second end plate 112 in a direction toward the inner plate 146.

Eventually, the seal member 16 on the tubular core 152 will come in contact with the sealing surface 178 of the inner liner 140, and the first end 154 of the tubular core 152 may abut or engage the inner plate 146. A seal is then formed between the seal member 166 and the sealing surface 178 of the inner liner, and the tubular core 152 is removably fixed in the sealed position (FIG. 13).

When the core 152 is in the sealed position of FIG. 13, the flow passage 162 of the projection 160 is aligned with the open aperture 150 in the inner plate 146. The projection 160 is engaged with the air flow passageway 84 in the standpipe 80 to provide air flow passage of air 78 and air within the inner cavity 148 of the filter cartridge 92 to outside of the filter cartridge 92, for example, to the fuel tank.

By comparing FIGS. 12 and 13, it can be seen how part of the method of installing the filter cartridge 92 includes forming a seal between the grommet 134 on the filter cartridge 92 and the standpipe 80.

When the filter cartridge is installed over the standpipe 80, as shown in FIG. 13, the projection 160 will engage the valve assembly 50 and move the valve ball 54 from the position of FIG. 2 to the position of FIG. 5. This opens the clean fuel flow passage 86 in the standpipe 80, as well as establish the air flow path between the flow passageway 162 in the projection 160 and the air flow passageway 84 in the standpipe 80.

A method of filtering fuel can include using the filter cartridge 92 installed over a standpipe 80 in the filter housing 62 and allowing some fuel to bypass the tubular core 152 between the second end 156 of the core 152 and the standpipe 80.

D. Example Cartridges, FIGS. 15-18; and Systems FIGS. 19 & 20

Attentions is now directed to FIGS. 15-18, which depict two more embodiments of filter cartridges 202. The filter cartridges 202 are usable within a system 302 similar to that shown in FIG. 6, but with differences. For example, the system 302 in which the cartridges 202 are usable in includes a housing 362, having a housing body 364 with a sidewall 366 and an end wall 368 defining a filter cartridge space 370 to accommodate the cartridge 202 therein. A standpipe 372 extend from the end wall 368 into the filter cartridge space 370. The filter cartridge 202 can be mounted over the standpipe.

Figure 15:
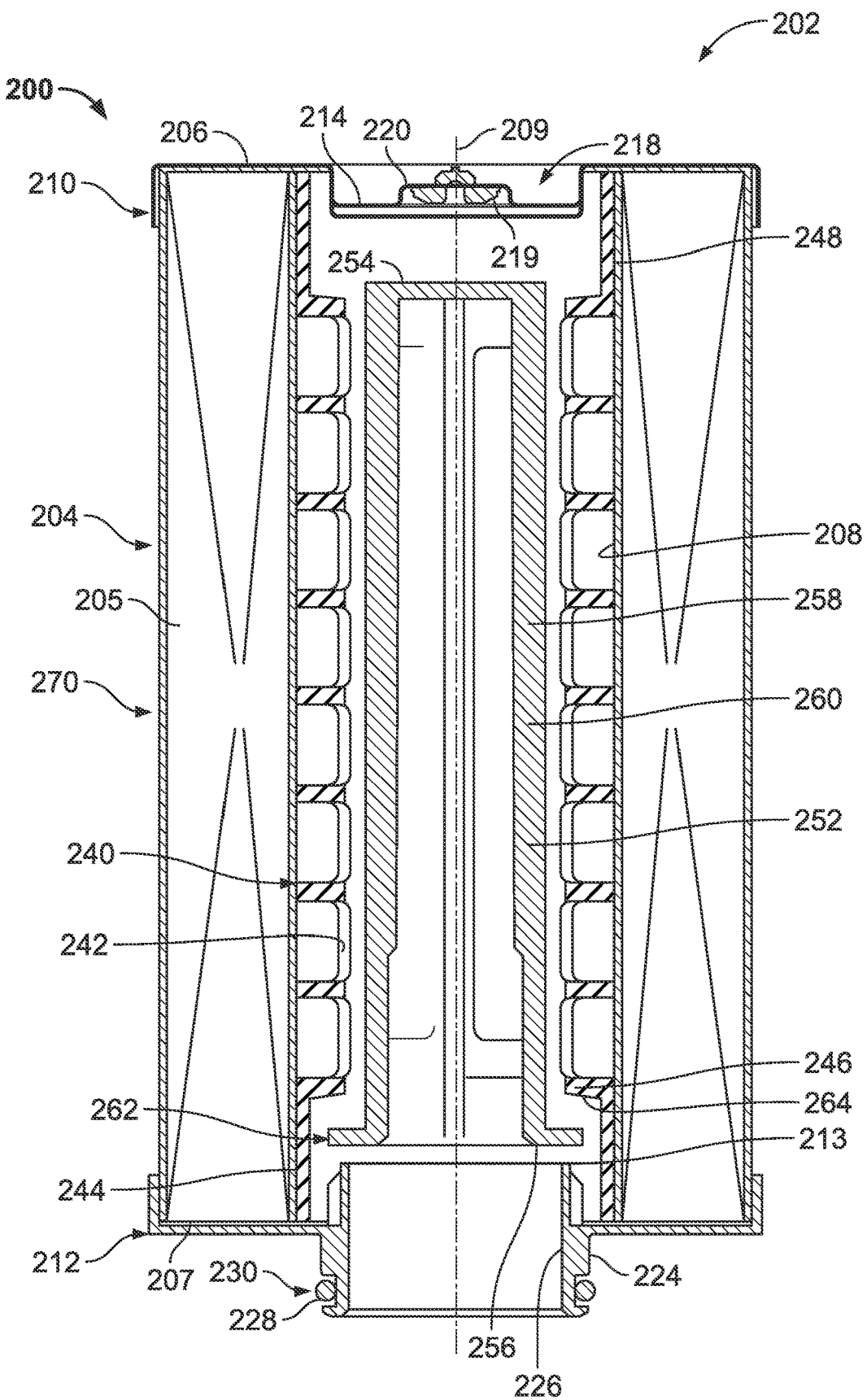
FIG. 15 is a cross-sectional view of another embodiment of a filter cartridge usable in the system having a filter housing and a standpipe, constructed in accordance with principles of this disclosure.
Figure 16:
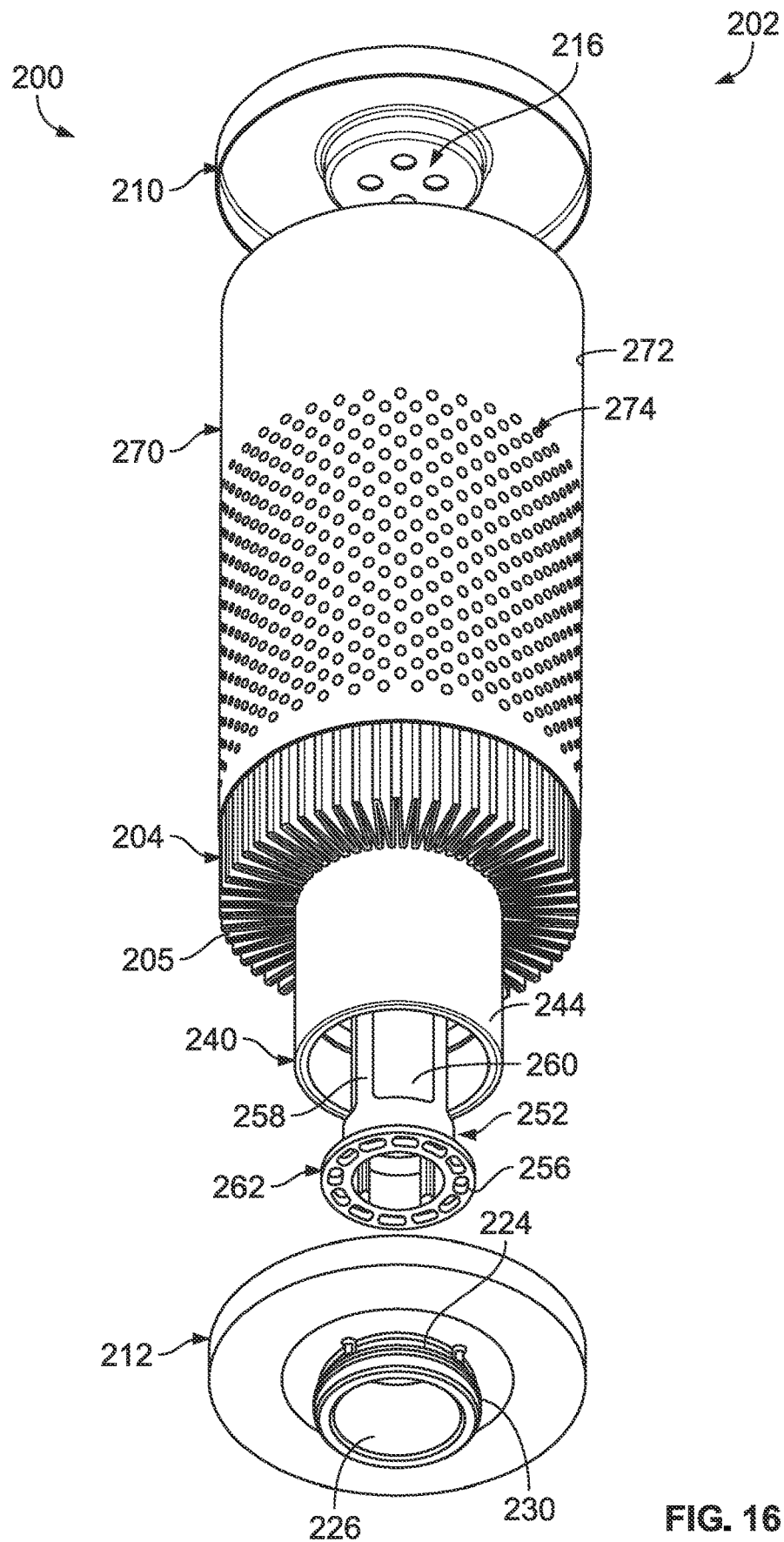
FIG. 16 is an exploded, perspective view of the filter cartridge of FIG. 15.
Figure 17:
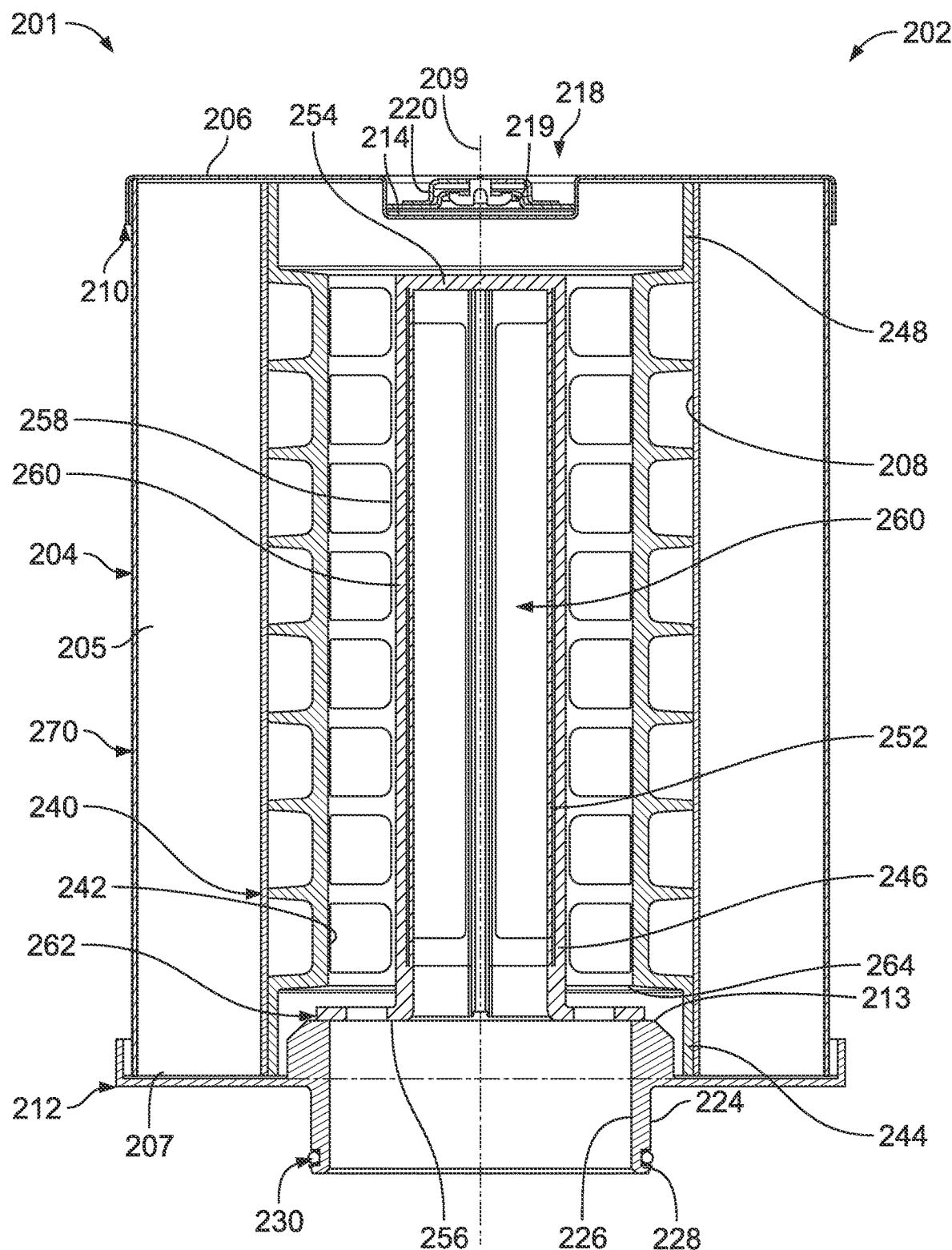
FIG. 17 is another embodiment of a filter cartridge, similar to the embodiment of FIG. 15, but showing different size proportions.
Figure 18:
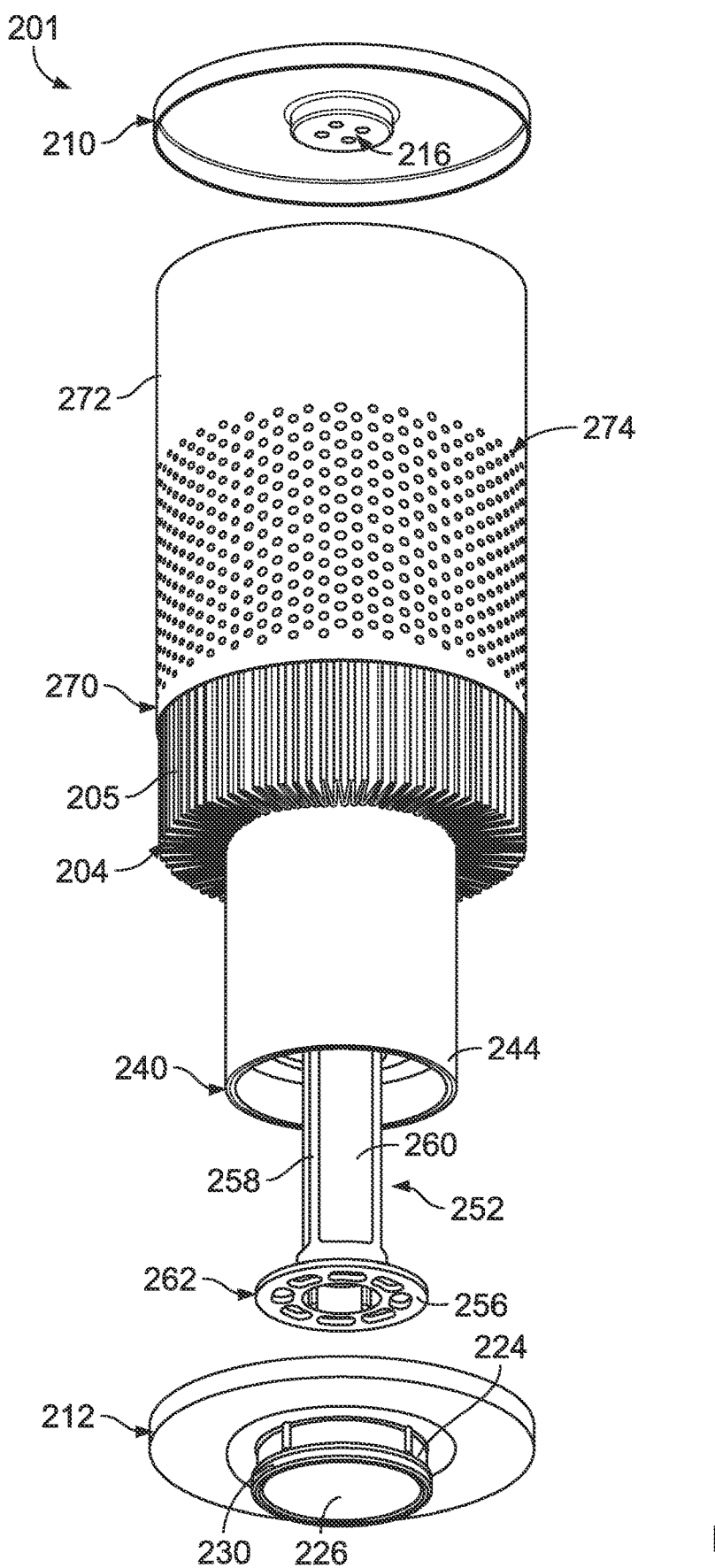
FIG. 18 is an exploded, perspective view of the filter cartridge of FIG. 17.

The filter cartridge depicted in FIGS. 15 and 16 is depicted at 200, while the cartridge depicted in FIGS. 17 and 18 is depicted at 201. Filter cartridges 200, 201 are identical in structure, with the exception of the length and width. That is, depending on the size of the system in which the filter cartridges 200, 201 are used, the appropriate filter cartridges 200, 201 will be selected to fit within the system. The description for the cartridges 200, 201 are the same, and will include the same reference numbers. The generic reference to both filter cartridges 200, 201 will be referred to by reference number 202.

The filter cartridge 202 includes a first filter media construction 204. The first filter media construction 204 can be many different types of filter media, but generally is pleated media 205. The pleated media 205 forms a tubular extension having a first end 206 and an opposite second end 207. The tubular construction can be generally cylindrical, defining an open interior volume 208.

The filter cartridge 202 defines a central longitudinal axis 209. The central axis 209 is centered within the cartridge 202 and is centered within the first filter media construction 204. As will be explained further below, in example embodiments, the standpipe 372 which the filter cartridge 202 is fitted over, will be off-axis. That is, a central longitudinal axis 374 of the standpipe 372 will not be co-linear with the axis 209 (see FIG. 19).

The filter cartridge 202 further includes a first end plate 210 connected to the first end 206, and a second end plate 212 connected to the second end 207.

The first end plate 210 can be seen in perspective view in FIGS. 16 and 18. The first end plate 210 has a generally round outer shape, and an indented section 214 in a center portion. In general, the first end plate 210 is a closed surface, but at the center of the indented section 214 is a small hole arrangement 216 comprising one or more through holes and a burp valve arrangement 218. The burp valve arrangement 218 includes an umbrella burp valve 219 and a shroud 220 (FIGS. 15 and 17).

The hole arrangement 216 and burp valve arrangement 218 allows air that is contained between a cover of the housing (such as cover 64 and housing 62) to be evacuated from the system by way of flow through the burp valve arrangement 218.

The second end plate 212 is generally round with an axial section 224. The axial section 224 surrounds an open aperture 226. The axial section 224 defines a radial recess 228 for holding a seal member 230.

In this example embodiment, the radial recess 228 is outwardly extending, such that the seal member 230 forms a radially outwardly extending seal member. In other embodiments, the radial recess 228 and seal member 230 could be radially inwardly extending.

The filter cartridge 202 further includes an inner liner 240. The inner liner 240 extends between the first end 206 and second end 207 and lines the interior volume 208 of the first filter media construction 204. In general, the inner liner 240 is porous, to allow for liquid, which has passed through the first media construction 204 to flow through to an interior 242.

In reference to FIGS. 15 and 17, the inner liner 240 includes a first section 244 having a first inner diameter. The first section 244 engages against and is adjacent the second end plate 212.

The inner liner 240 further includes a second section 246 having a second inner diameter. The second inner diameter is smaller than the first inner diameter of the first section 244. The second section 246 is axially spaced from the second end plate 212, such that the first section 244 is axially between the second section 246 and the second end plate 212.

It can be seen how at the opposite end of the filter cartridge 202, there is a similar arrangement including a third section 248 adjacent to the first end plate 210. The first section 248 has a diameter that is larger than the diameter of the second section 246. The second section 246 extends a majority of the length of the filter cartridge 202, and is axially spaced from each of the first end plate 210 and second end plate 212 by the respective third section 248 and first section 244.

In accordance with principles of this disclosure, the filter cartridge 202 includes a tubular core 252. The tubular core 252 is movably oriented within the inner liner 240. The tubular core 252 can be moved longitudinally within the inner liner 240. As such, the core 252 is a free-floating core.

The tubular core 252 has a first end 254 and an opposite second end 256. A side wall 258 extends between the first end 254 and the second end 256.

The tubular core 252 includes a second filter media construction 260. The second filter media construction 260 can be various types of filter media, but it is often convenient for the second filter media construction 260 to comprise hydrophobic media. The hydrophobic media will repel and prevent water from penetrating. As such, it will encourage the formation of water droplets to coalesce and drip by gravity to the bottom of the filter cartridge 202.

The tubular core 252 includes an outwardly radially directed flange 262 adjacent the second end 256 of the core 252. While shown here as a flange 262, it should be understood, that the flange 262 can be segments, such that they are separate feet.

The flange 262 has an outer diameter, which is smaller than the first inner diameter of the first section 244 of the inner liner 240. The flange 262 outer diameter is also larger than the second inner diameter of the second section 246 of the inner liner 240. The tubular core 252 is positioned within the inner liner 240 such that the flange 262 is positioned between the second end plate 212 and the second section 246 of the inner liner 240. In this embodiment, the second end plate 212 has an internal axially extending wall 213 projecting into the interior of the filter cartridge 202 and within the first section 244 of the inner liner 240. The axial extension 213 has an outer diameter which is smaller than the outer diameter of the flange 262.

From an inspection of FIGS. 15-17, it can be seen how the flange 262 can be movable within the first section 244 of the inner liner 240, but is constrained in axial motion between engaging against the axial extension 213 of the second end plate 212 and the second section 246 of the inner liner 240. In particular, the second section 246 of the inner liner 240 has an axial surface 264 directed toward and facing the second end plate 212. The axial surface 264 forms an upper limiting portion of the motion of the core 252.

The sidewall 258 of the core 252 has a conical shape that is larger at the second end 256 than the first end 254. Due to the shape of the tubular core 252, a fuel bypass 380 (FIG. 20), analogous to that shown at 172 in FIG. 13, is formed between the second end 256 of the core 252 and the standpipe 372, during filtering operation, when the cartridge 202 is installed on the standpipe 372. The sidewall 258 has a draft angle from the first end 254 to the second end 256 of between 0.25-3°, to define the conical shape of the sidewall 258.

The bypass 380 that is created between the sidewall 258 and the standpipe 372 has advantages. These advantages are discussed above with respect to the embodiment of FIG. 13, and are applicable to the filter cartridge 202 shown in FIGS. 15-17.

The filter cartridge 202 further includes a perforated outer wrap 270. The outer wrap 270 covers the first filter media construction 204 and extends from the first end plate 210 to the second end plate 212. As can be seen in FIGS. 16 and 18, the outer wrap 270 includes a solid unperforated section 272 extending from the first end plate 210 a distance of at least 25% of a length of the filter cartridge 202. The length is typically less than 50%, and can be between 30-40% of a length of the filter cartridge 202. The outer wrap 270 further includes a perforated section 274 extending from the solid, perforated section 272 to the second end plate 212.

As mentioned above, in systems that use the filter cartridges 202, the standpipe 372 has a central longitudinal axis 374 that is not in alignment or co-linear with the longitudinal axis 209 of the filter cartridge 202. When the filter cartridge 202 is installed into the system 302, the filter cartridge 202 is positioned over the standpipe 372 and into the filter cartridge space 370 of the housing 362 to move the tubular core 252 into an off-axis position on the standpipe 372, which is not co-linear with the central longitudinal axis 209 of the filter cartridge 202. See FIG. 20. This will move the flange 262 from a positon engaging against the axial extension 213 of the second end plate 212 and into engagement against the axial surface 264 of the second section 246 of the inner liner 240. That is, the radially directed flange 262 will engage against the inner liner 240 at the axial surface 264. This will also ensure that the core 252 does not engage against and interfere with the burp valve arrangement 218. The core 252 can freely float to accommodate the asymmetry of the housing 362 and the standpipe 372. No special clocking is required for installation.

E. The Embodiment of FIGS. 21 and 22

Figure 19:
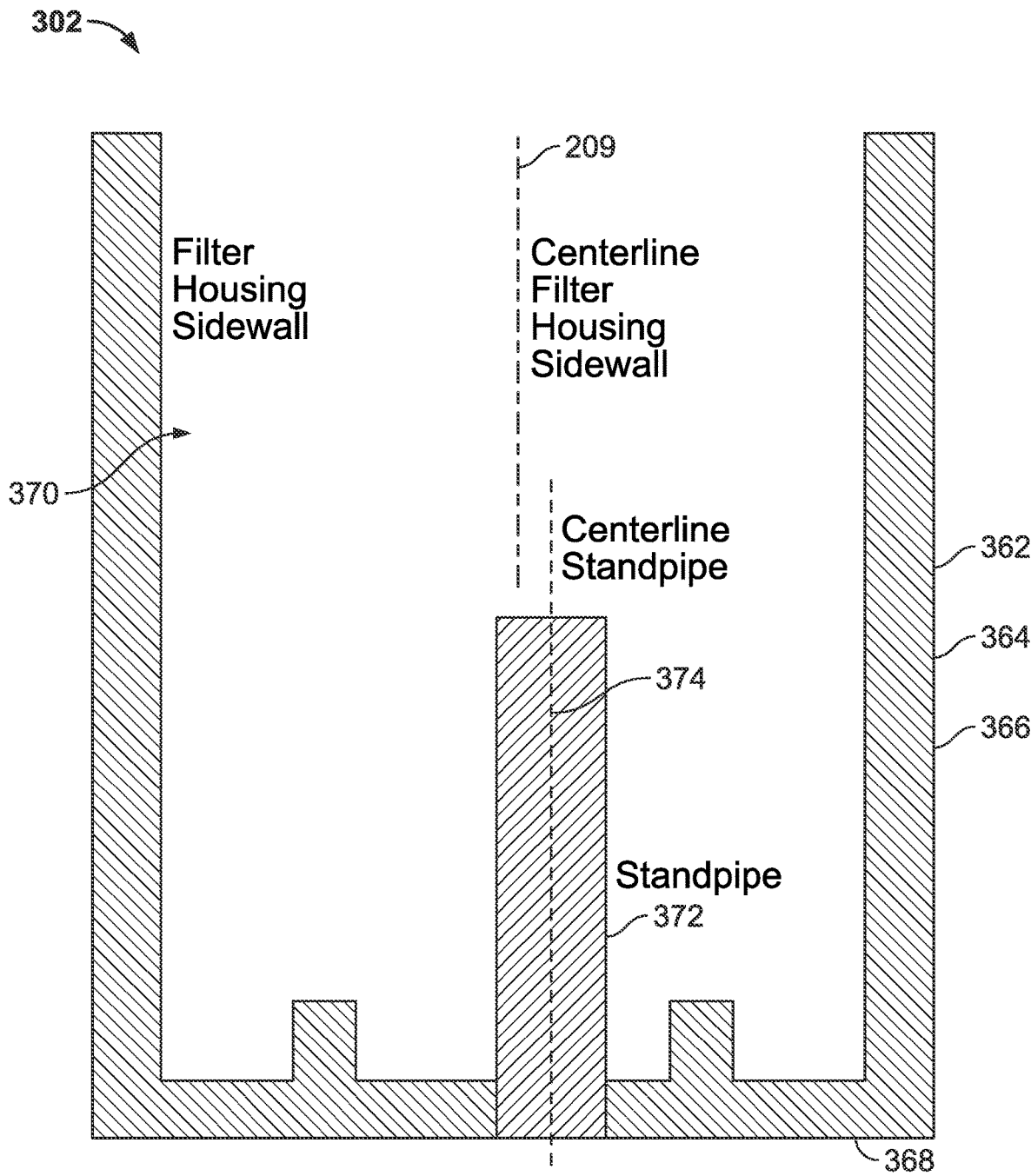
FIG. 19 is a schematic view of a system usable with the embodiment of FIGS. 15-18.
Figure 20:
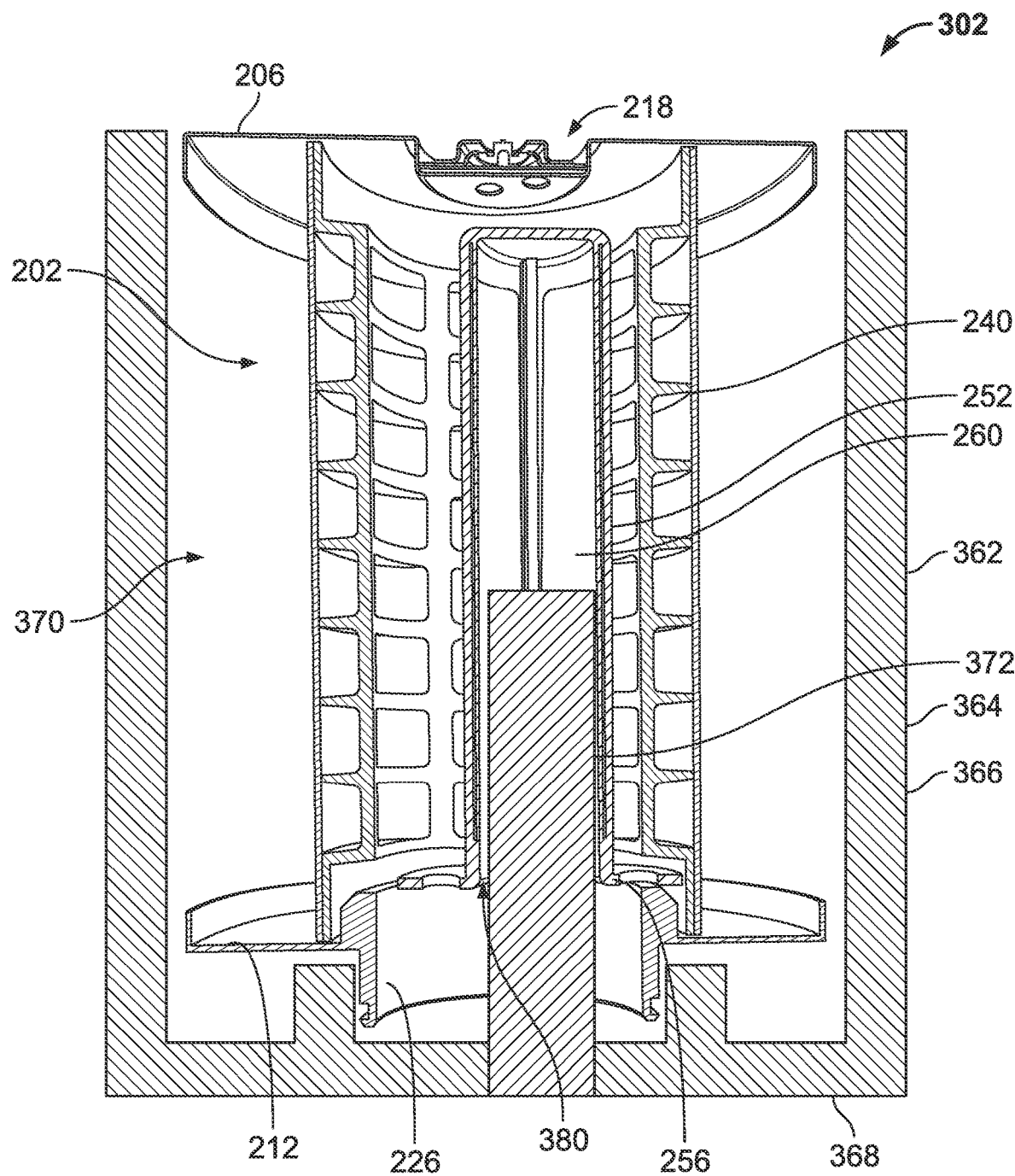
FIG. 20. is a schematic view of the system of FIG. 19 with one of the filter cartridges of FIGS. 15-18 installed therein.
Figure 21:
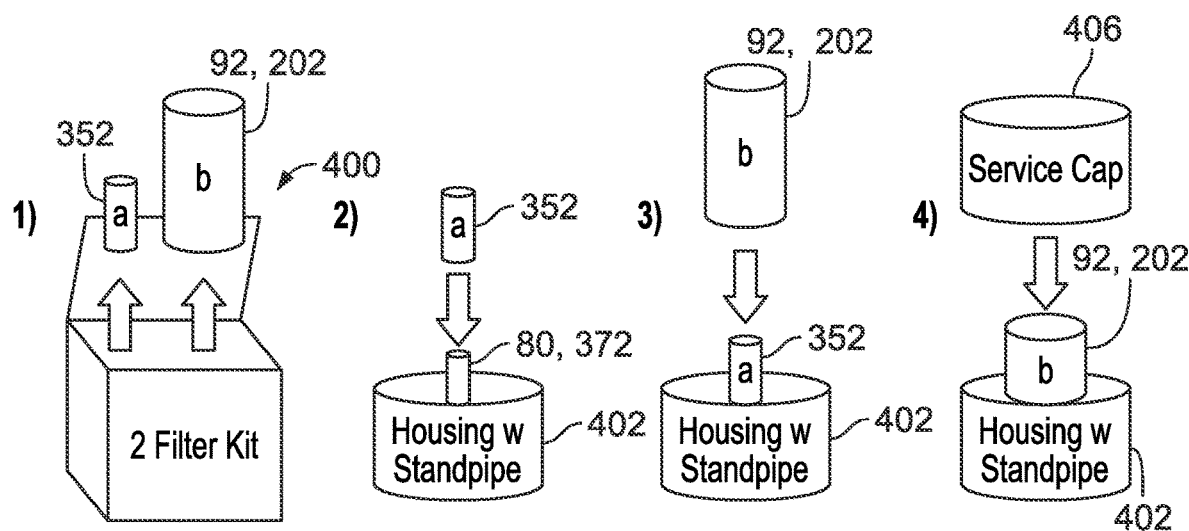
FIG. 21 is a schematic view of a kit and steps of using the kit, constructed in accordance with principles of this disclosure.
Figure 22:
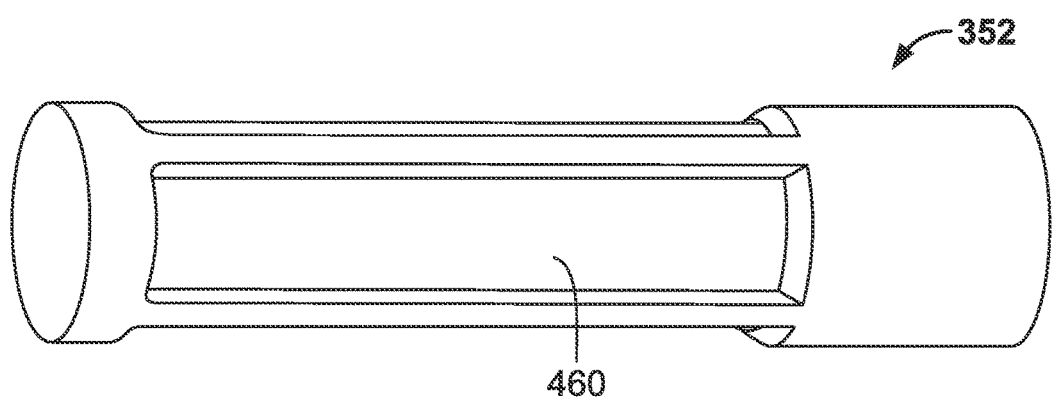
FIG. 22 is a perspective view of an embodiment of a tubular core, usable in the system of FIG. 21.

FIGS. 21 and 22 shown an alternative embodiment of a filter and core, usable in the systems of FIG. 6 and FIG. 19. In FIGS. 21 and 22, a tubular core 352 is used, similar to core 252, but without a radially directed flange 262. This permits the core 352 to pass through the second end plate 112, 212 of the filter cartridge 92, 202. As can be appreciated, the core 352 and the filter cartridge 92, 202 are completely independent and separable members.

FIG. 21 shows a kit 400 and steps in a method for providing a filter assembly. In step 1, the kit 400 is provided having the core 352 and filter cartridge 92, 202. In alternative methods, the core 352 and cartridge 92, 202 are provided separately. The core 352 can be constructed as above for core 252, but without the flange 262. It has media, such as hydrophobic media 460.

In step 2, the core 352 is positioned or oriented onto the standpipe 80, 372 of the housing 402. The person installing the core 352 can manually and visually align these components independently.

In step 3, the filter cartridge 92, 202 is positioned or oriented over the top of the core 352 and onto the standpipe 80, 372 of the housing 402. This allows the installer to manually and visually align the filter cartridge 92, 202 independently.

In step 4, the housing 402 is closed by installing and tightening a service cap 406 before priming the system.

The above represents example principles. Many embodiments can be made using these principles.

What is claimed is:

1. A filter cartridge comprising:
   (a) a first filter media construction defining an interior volume, and having a first end and a second end;
   (b) a first end plate connected to the first end;
   (c) a second end plate connected to the second end;
   (d) an inner liner extending between the first end and second end and lining the interior volume of the first filter media construction;
   (e) a tubular core within the inner liner and comprising first and second opposite ends with a sidewall of a second filter media construction extending therebetween;
      both of the first end and second end being within the inner liner;
      wherein a fuel bypass is formed between the second end of the tubular core and a standpipe, when the filter cartridge is installed on a standpipe;
   (f) an inner plate, spaced from each of the first end plate and second end plate, extending along a plane perpendicular to a central longitudinal axis of the liner;
      (i) the inner plate having an open aperture therein;
      (ii) the inner liner being non-porous between the first end plate and the inner plate and defining an inner cavity structured to receive air.

2. A filter cartridge comprising:
   (a) a first filter media construction defining an interior volume, and having a first end and a second end;
   (b) a first end plate connected to the first end;
   (c) a second end plate connected to the second end;
   (d) an inner liner extending between the first end and second end and lining the interior volume of the first filter media construction;
   (e) a tubular core within the inner liner and comprising first and second opposite ends with a sidewall of a second filter media construction extending therebetween;
      both of the first end and second end being within the inner liner;
      wherein a fuel bypass is formed between the second end of the tubular core and a standpipe, when the filter cartridge is installed on a standpipe;
   (f) wherein the inner liner includes a first section with a first inner diameter, adjacent the second end plate, and a second section with a second inner diameter smaller than the first inner diameter; the second section being axially spaced from the second end plate with the first section therebetween.

3. The filter cartridge of claim 2 wherein the tubular core includes a radially directed flange adjacent the second end of the core; the flange having an outer diameter:
   (i) smaller than the first inner diameter of the first section of the inner liner; and (ii) larger than the second inner diameter of the second section of the inner liner; and
   wherein the tubular core is axially and radially movable within the inner liner and limited in motion by the flange engaging against either the second end plate or the second section of the inner liner.

4. A filter cartridge comprising:
   (a) a first filter media construction defining an interior volume, and having a first end and a second end;
   (b) a first end plate connected to the first end;
   (c) a second end plate connected to the second end;
   (d) an inner liner extending between the first end and second end and lining the interior volume of the first filter media construction;
   (e) an inner plate, spaced from each of the first end plate and second end plate, extending along a plane perpendicular to a central longitudinal axis of the liner;
      (i) the inner plate having an open aperture therein;
      (ii) the inner liner being non-porous between the first end plate and the inner plate and defining an inner cavity structured to receive air;
   (f) a tubular core having an outermost diameter smaller than an inner diameter of the inner liner; the tubular core being movably oriented within the inner liner, and having a projection;
      (i) the core being movably oriented along a longitudinal axis between the second end plate and the inner plate;
      (ii) the projection defining a flow passage therethrough;
      (iii) the core being free-floating and movable from a first position, in which the core can move along the longitudinal axis of the core, and a sealed position, in which the core is sealed to the inner liner; and
   wherein in the sealed position, the flow passage through the projection provides an air flow passage of air within the inner cavity to outside of the filter cartridge.

5. A filter cartridge comprising:
   (a) a first filter media construction defining an interior volume, and having a first end and a second end;
   (b) a first end plate connected to the first end;
   (c) a second end plate connected to the second end;
   (d) an inner liner extending between the first end and second end and lining the interior volume of the first filter media construction;
   (e) a tubular core within the inner liner and comprising first and second opposite ends with a sidewall of a second filter media construction extending therebetween;
      wherein a fuel bypass is formed between the second end of the tubular core and a standpipe, when the filter cartridge is installed on a standpipe; and
   wherein the inner liner includes a first section with a first inner diameter, adjacent the second end plate, and a second section with a second inner diameter smaller than the first inner diameter; the second section being axially spaced from the second end plate with the first section therebetween.

6. The filter cartridge of claim 5 wherein the tubular core includes a radially directed flange adjacent the second end of the core; the flange having an outer diameter:
   (i) smaller than the first inner diameter of the first section of the inner liner; and (ii) larger than the second inner diameter of the second section of the inner liner; and
   wherein the tubular core is axially and radially movable within the inner liner and limited in motion by the flange engaging against either the second end plate or the second section of the inner liner.

7. The filter cartridge of claim 5 wherein the second filter media construction comprises hydrophobic media.

8. The filter cartridge of claim 5 wherein the tubular core has a projection formed as a single piece with the core; the projection defining a flow passage therethrough.

9. The filter cartridge of claim 5 wherein the tubular core is movably oriented within the inner liner, and the tubular core is free-floating from a first position, in which the tubular core can move along a longitudinal axis of the tubular core, and a sealed position, in which the tubular core is sealed to the inner liner.

10. The filter cartridge of claim 9 wherein the tubular core includes a seal member, forming a seal with the inner liner.

11. The filter cartridge of claim 10 wherein the seal member is an outward radially directed seal member.

12. The filter cartridge of claim 5 further comprising:
(a) an inner plate, spaced from each of the first end plate and second plate, extending along a plane perpendicular to an a central longitudinal axis of the liner;
   (i) the inner plate having an open aperture therein;
   (ii) the inner liner being non-porous between the first end plate and the inner plate and defining an inner cavity structured to receive air.

13. The filter cartridge of claim 5 further including a grommet located at the second end of the first filter media construction.

14. The filter cartridge of claim 13 wherein the second end plate has a grommet holder extending axially away from a remaining part of the filter cartridge, and the grommet is positioned within a groove in the grommet holder.

\* \* \* \* \*